(12) United States Patent
Meguriya et al.

(10) Patent No.: US 11,885,097 B2
(45) Date of Patent: Jan. 30, 2024

(54) WORK MACHINE

(71) Applicant: HITACHI CONSTRUCTION MACHINERY CO., LTD., Tokyo (JP)

(72) Inventors: Shuuichi Meguriya, Ishioka (JP); Shiho Izumi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 496 days.

(21) Appl. No.: 17/275,777

(22) PCT Filed: Mar. 17, 2020

(86) PCT No.: PCT/JP2020/011831
§ 371 (c)(1),
(2) Date: Mar. 12, 2021

(87) PCT Pub. No.: WO2020/196116
PCT Pub. Date: Oct. 1, 2020

(65) Prior Publication Data
US 2022/0056663 A1 Feb. 24, 2022

(30) Foreign Application Priority Data
Mar. 26, 2019 (JP) .................. 2019-059444

(51) Int. Cl.
E02F 3/43 (2006.01)
E02F 9/26 (2006.01)
E02F 9/20 (2006.01)

(52) U.S. Cl.
CPC ............ E02F 3/437 (2013.01); E02F 3/439 (2013.01); E02F 9/262 (2013.01); E02F 9/265 (2013.01); E02F 9/2029 (2013.01); E02F 9/2033 (2013.01)

(58) Field of Classification Search
CPC ...................................... E02F 3/437
See application file for complete search history.

(56) References Cited

U.S. PATENT DOCUMENTS

2005/0071064 A1* 3/2005 Nakamura ............ F15B 11/167
701/50
2016/0138240 A1* 5/2016 Ikegami .................... E02F 9/26
60/420

(Continued)

FOREIGN PATENT DOCUMENTS

CN 1639464 A 7/2005
CN 105431596 A 3/2016

(Continued)

OTHER PUBLICATIONS

Extended European Search Report received in corresponding European Application No. 20777156.9 dated Dec. 12, 2022.

(Continued)

Primary Examiner — Shelley Chen
(74) Attorney, Agent, or Firm — Mattingly & Malur, PC

(57) ABSTRACT

A controller 20 mounted on a hydraulic excavator 1 that is able to perform machine control transmits work situation parameters (machine body position, hydraulic working fluid temperature, bucket weight, and target surface gradient) to a management server 71, receives, from the management server, control command correction values that are calculated by the management server on the basis of the work situation parameters and that represent correction values for correcting control commands, and controls hydraulic actuators 5, 6, and 7 with corrected control commands that represent the control commands corrected on the basis of the control command correction values.

5 Claims, 15 Drawing Sheets

(56) References Cited

U.S. PATENT DOCUMENTS

| | | | |
|---|---|---|---|
| 2018/0106016 A1* | 4/2018 | Uji | G05B 19/042 |
| 2018/0282969 A1* | 10/2018 | Hita | E02F 9/2271 |
| 2019/0063041 A1 | 2/2019 | Izumi et al. | |
| 2019/0119886 A1 | 4/2019 | Izumi et al. | |

FOREIGN PATENT DOCUMENTS

| | | | | | |
|---|---|---|---|---|---|
| CN | 107614801 A | | 1/2018 | | |
| CN | 107407077 B | * | 7/2021 | | E02F 3/32 |
| CN | 108699814 B | * | 4/2022 | | B64C 39/024 |
| EP | 1 273 720 A1 | | 1/2003 | | |
| JP | 2017-75500 A | | 4/2017 | | |
| JP | 2018-003386 A | | 1/2018 | | |
| JP | 2018-003388 A | | 1/2018 | | |
| JP | 2018-003515 A | | 1/2018 | | |
| WO | 2015/137525 A1 | | 9/2015 | | |

OTHER PUBLICATIONS

International Search Report of PCT/JP2020/011831 dated Jun. 9, 2020.

Chinese Office Action received in corresponding Chinese Application No. 202080004838.1 dated Jan. 7, 2022.

International Preliminary Report on Patentability received in corresponding International Application No. PCT/JP2020/011831 dated Oct. 7, 2021.

\* cited by examiner (a) VECTOR V0 BASED ON OPERATOR'S OPERATION (b) CORRECTED VECTOR V1 BASED ON DISTANCE D (c) CORRECTED VECTOR V2 BASED ON CONTROL COMMAND CORRECTIVE VALUE ks

FIG. 14

| | Soil Quality Status | | | Fluid Temperature Status | | | Bucket Status | | | Gradient Status | | | Work Situation Patterns |
|---|---|---|---|---|---|---|---|---|---|---|---|---|---|
| | SOFT | MEDIUM | HARD | LOW | NORMAL LOW | NORMAL | LIGHT | MEDIUM | HEAVY | DOWN | HORIZONTAL | UP | |
| | SS1 | SS2 | SS3 | SO1 | SO2 | SO3 | SB1 | SB2 | SB3 | SG1 | SG2 | SG3 | |
| P1 | ○ | | | | | ○ | | ○ | | | ○ | | |
| Pn | | | ○ | ○ | | | | | ○ | | | ○ | |

| WORK SITUATION PATTERNS | P1 | P2 | ... | Pn |
|---|---|---|---|---|
| CONTROL COMMAND CORRECTIVE VALUE (AVERAGE VALUE OF PAST VALUES) | ks1 | ks2 | ... | ksn |
| PAST VALUES | ks11 | ks21 | ... | ksn1 |
| | ks12 | ks22 | ... | ksn2 |
| | ks13 | ks23 | ... | ksn3 |
| | ks14 | | ... | ksn4 |
| | ... | ... | ... | ... |

FIG.17

| CLAW TIP ERROR ZONE | DESCRIPTION | ADJUSTMENT VALUE |
|---|---|---|
| A5 | LARGE LIFT | ADJUSTMENT VALUE 5 |
| A4 | SMALL LIFT | ADJUSTMENT VALUE 4 |
| A1 | NO ADJUSTMENT REQUIRED | ADJUSTMENT VALUE 1 |
| A2 | SMALL DIP | ADJUSTMENT VALUE 2 |
| A3 | LARGE DIP | ADJUSTMENT VALUE 3 |

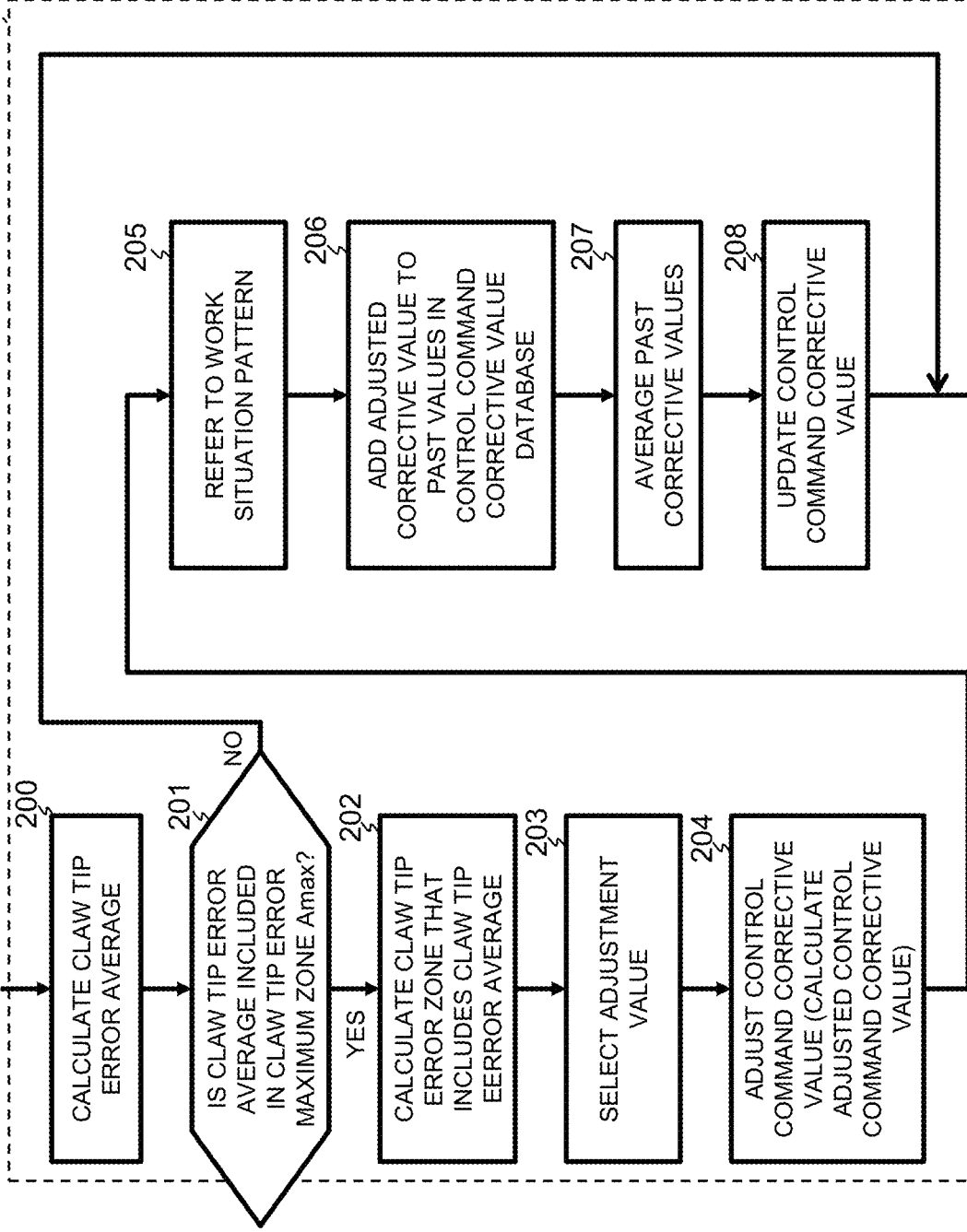

WORK MACHINE

TECHNICAL FIELD

The present invention relates to a work machine having a controller for correcting control parameters.

BACKGROUND ART

Work machines having a front work implement (also referred to as a "work implement") including a plurality of front members (specifically, a boom, an arm, and a work tool (e.g., a bucket)) that can be pivoted in vertical directions include a hydraulic excavator. The hydraulic excavator includes a front work implement and a machine body including an upper swing structure and a lower track structure. The boom has a proximal end portion pivotally supported on the upper swing structure.

The front members of the front work implement are actuated by supplying a hydraulic fluid generated by a hydraulic pump to hydraulic cylinders for moving the boom, the arm, and the bucket, respectively. When an operator operates a control lever, the front member that is a target to be operated is actuated to make a desired motion. An action for raising the boom by extending the boom cylinder will be referred to as a boom raising action, an action for lowering the boom by contract the boom cylinder will be referred to as a boom lowering action, an action for causing the arm to be pivoted by extending the arm cylinder to move the distal end of the arm toward the machine body will be referred to as an arm crowding action, an action for causing the arm to be pivoted by contracting the arm cylinder to move the distal end of the arm away from the machine body will be referred to as an arm dumping action, an action for causing the bucket to be pivoted by extending the bucket cylinder will be referred to as a bucket crowding action, and an action for causing the bucket to be pivoted by contract the bucket cylinder will be referred to as a bucket dumping action. A crowding action will also be referred to as an excavating action, and a dumping action will also be referred to as a soil discharging action.

The hydraulic excavator described above has a function to control the movement of the hydraulic cylinders so as to cause the front work implement (a tip end of the bucket) to move along a target surface representing a target shape for an object to be excavated. Further, the hydraulic excavator described above has a function to stop the bucket on the target surface not only when performing an excavating operation mainly with the arm crowding action but also when performing a positioning operation to operate the boom and the bucket to move the bucket to an excavation starting position. The functions for automatically or semi-automatically controlling actions of the front work implement will be referred to as machine control.

When the front work implement is controlled under such machine control, the accuracy with which the front work implement excavates soil can be lowered if the operation characteristics of the hydraulic cylinders are not sufficiently grasped. The operation characteristics of the hydraulic cylinders suffer variations on account of the differences between individual front work implements (i.e., the differences between individual hydraulic excavators). Patent Document 1 discloses an invention regarding a calibration mode for calibrating variations of the operation characteristics of hydraulic cylinders on each machine body, and attempts to restrain a reduction in the accuracy with which to excavate soil by calibrating the variations of the operation characteristics of the hydraulic cylinders.

PRIOR ART DOCUMENT

Patent Document

Patent Document 1: WO2015/137525

SUMMARY OF THE INVENTION

Problem to be Solved by the Invention

The accuracy with which to excavate soil under machine control can depend on the work situation (work environment). For example, the accuracy with which to excavate soil under machine control is affected by the hardness of soil to be excavated, the temperature of a hydraulic working fluid for actuating the front work implement (fluid temperature), the weight of the bucket, the gradient of the target surface, and so on. In other words, in order to excavate soil accurately under machine control, it is necessary to correct control parameters used for machine control depending on the work situation, and also to change control logics for each work situation and adjust movement of the machine body each time using tools for adjusting the machine body.

The technology disclosed in Patent Document 1 is practiced when the hydraulic excavator is shipped from the factory or before the hydraulic excavator is introduced into a work site, restraining a reduction in the accuracy that is caused by variations of the operation characteristics of hydraulic cylinders on each machine body. Consequently, though a reduction in the accuracy due to the machine body can be restrained, an assumed level of accuracy may not possibly be achieved if the work situation (soil quality, fluid temperature, bucket weight, target surface gradient, etc.) is changed. In other words, each time the work situation changes, the accuracy needs to be adjusted depending on the change in the work situation, and the accuracy adjustment takes time before the hydraulic excavator does actual work.

It is an object of the present invention to provide a work machine that is capable of quickly reflecting control parameters (correction values) suitable for the work situation around the work machine.

Means for Solving the Problem

The present application includes a plurality of means for solving the above problems. According to an example, a work machine includes a multi-joint work implement that forms a target surface with a bucket, a plurality of hydraulic actuators that drive the work implement, a controller that is configured to calculate a control command for at least one of the plurality of hydraulic actuators to hold an operation locus of the bucket above the target surface on the basis of a distance from the work implement to the target surface, and to control the at least one of the hydraulic actuators on the basis of the control command, and a communication device that performs bidirectional communication with a management server. The controller transmits work situation parameters of the work machine to the management server, receives, from the management server, a control command correction value that is computed by the management server on the basis of the work situation parameter and that represents a correction value for correcting the control command, and controls the at least one of the hydraulic actuators with a corrected control command that represents the control command corrected on the basis of the control command correction value.

Advantages of the Invention

According to the present invention, since machine control is performed using control parameters based on the work situation (work environment) around the hydraulic excavator, the accuracy with which to work can be increased more easily than heretofore.

BRIEF DESCRIPTION OF THE DRAWINGS

FIG. 14 is a diagram illustrating soil quality, fluid temperature, bucket, and gradient statuses associated with work situation patterns.

FIG. 17 is a diagram illustrating a plurality of claw tip error zones A1 through A5 and their description and the relation between the claw tip error zones A1 through A5 and a plurality of adjustment values 1 through 5 corresponding thereto.

FIG. 19 is a flowchart of a processing sequence executed in step 107 illustrated in FIG. 18.

MODE FOR CARRYING OUT THE INVENTION

Figure 1:
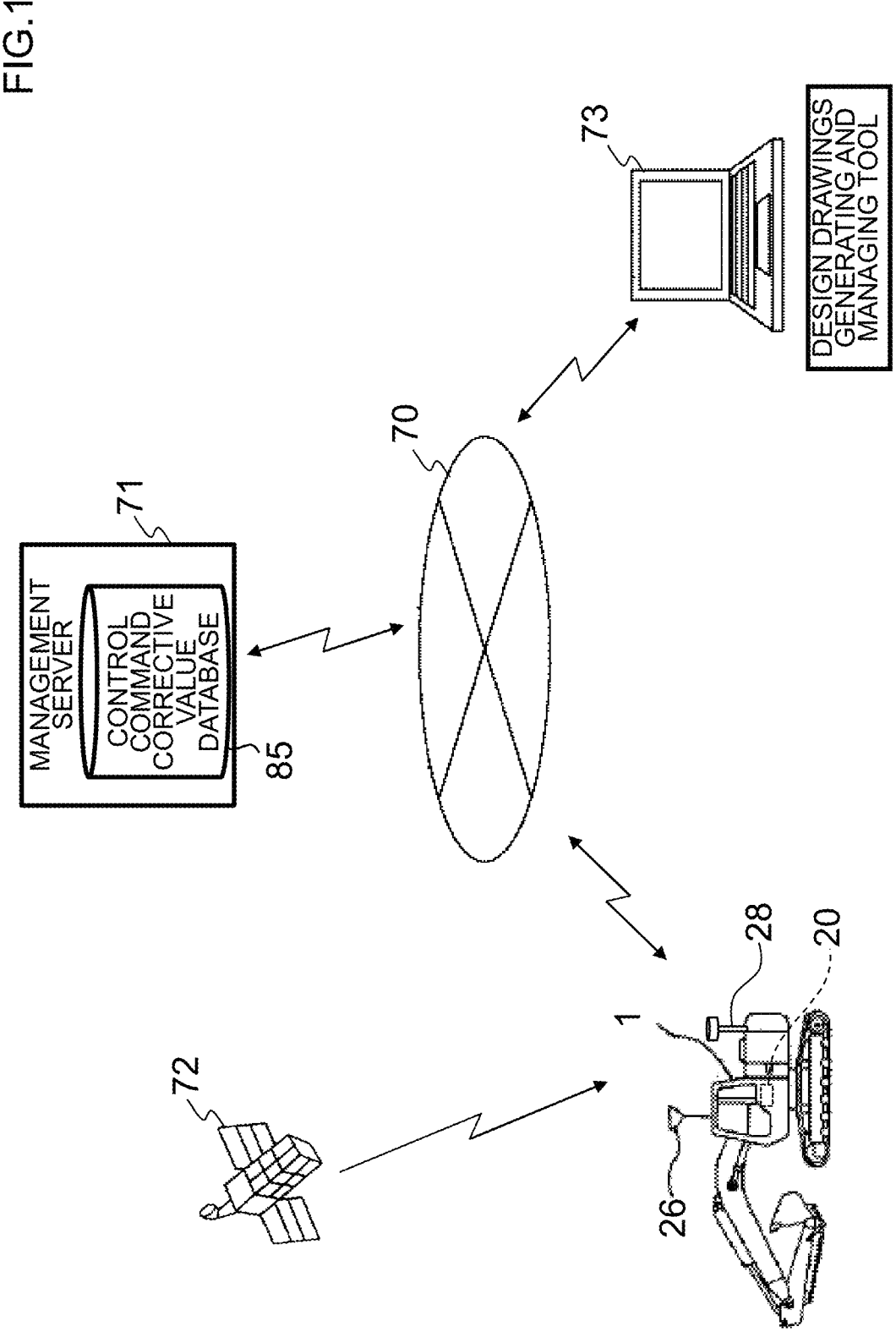
FIG. 1 is a diagram illustrating the configuration of a control system for a work machine according to an embodiment of the present invention.

An embodiment of the present invention will hereinafter be described with reference to the drawings. A hydraulic excavator with a bucket as a work tool will be illustrated below. However, the present invention is also applicable to a hydraulic excavator with an attachment other than a bucket or a work machine other than a hydraulic excavator. When a plurality of identical components exist, they are denoted by a reference character (numeral) with alphabetical letters as a suffix. Sometimes, those components may be referred to collectively with the alphabetical letters omitted. For example, when three pumps 300a, 300b, and 300c exist, they may be referred to collectively as pumps 300.

<Overall System Configuration>

FIG. 1 is a diagram illustrating the configuration of a control system for a work machine according to the embodiment of the present invention. The control system for the work machine illustrated in FIG. 1 includes a plurality of hydraulic excavators 1 and a management server 71 capable of performing bidirectional communication with the hydraulic excavators 1 through a communication link 70. FIG. 1 illustrates only one hydraulic excavator 1 as a representative one. The hydraulic excavators 1 are identical in structure to each other, and the structure of one hydraulic excavator 1 will mainly be described below.

The hydraulic excavator 1 is shipped from a factory of a manufacturer (maker) of the hydraulic excavator 1, and operates at a work site (construction site) for civil engineering work, construction work, disassembling work, dredging work, or the like. The hydraulic excavator 1 includes a controller 20 that computes a control command for at least one hydraulic actuator (e.g., a boom cylinder 5 (see FIG. 3)) for holding the operation locus of a bucket 10 (see FIG. 3) above a target surface that is defined by design drawings generated by a design drawings generating and managing tool 73, and that can perform machine control for controlling the at least one hydraulic actuator on the basis of the control command. The hydraulic excavator 1 also includes a wireless communication device 25 (see FIG. 3) that enables the controller 20 to perform bidirectional communication with an external terminal including the management server 71 through a communication antenna 26 in order to perform bidirectional communication with the management server 71 through the communication link 70.

The management server 71 calculates a control command correction value that is a correction value for correcting a control command calculated by the controller 20 of the hydraulic excavator 1 on the basis of work situation parameters of the hydraulic excavator 1, and transmits the calculated control command correction value to the hydraulic excavator 1. As described in detail later, the control command correction value calculated by the management server 71 is fixed for each work situation pattern that is decided on the basis of work situation parameters (e.g., machine body position data, fluid temperature data, bucket weight data, and target surface gradient data to be described later) transmitted from the hydraulic excavator 1. If work situation patterns of the respective hydraulic excavators 1 can be identified, the management server 71 is able to correct (change) not only the control command for one hydraulic excavator 1, but also the control commands for the plurality of hydraulic excavators 1 in parallel. The management server 71 includes a storage device (not depicted, e.g., a magnetic disk storage device) that stores a control command correction value database 85 (to be described in detail later) used in calculating control command correction values for the hydraulic excavators 1. The management server 71 is installed at a position remote from the hydraulic excavators 1, e.g., the home office, a branch office, a factory, etc., of the manufacturer of the hydraulic excavators 1. However, the management server 71 may not necessarily be installed in a facility of the manufacturer, but may be installed in a data center dedicated for running a server, or the like. The management server 71 is connected to the hydraulic excavators 1 and the design drawings generating and managing tool 73, for example, through the communication link 70 that may be a dedicated link, a public link, an Internet link, an optical link, a telephone link, a wired link, a wireless link, a satellite link, a mobile link, or the like.

The design drawings generating and managing tool 73 is a tool for generating and managing design drawings there a target surface is defined, and is implemented by a computer installed in the office of the contractor, for example. The design drawings generating and managing tool 73 is used by the user of the hydraulic excavator 1, such as an operator, an owner (owner company), a manager (managing company), etc., of the hydraulic excavator 1, for example. The user generates design drawings data using the design drawings generating and managing tool 73, and transmits the generated design drawings data via the communication link 70 to the controller 20 of the hydraulic excavator 1. According to the present embodiment, the design drawings data are transmitted from the design drawings generating and managing tool 73 to the controller 20. However, insofar as design drawings data can be stored in the controller 20, any means may be used to supply the design drawings data to the controller 20. Specifically, design drawings data may be downloaded from a storage device on a network or an external storage device (e.g., a semiconductor memory or the like) to the controller 20.

Figure 2:
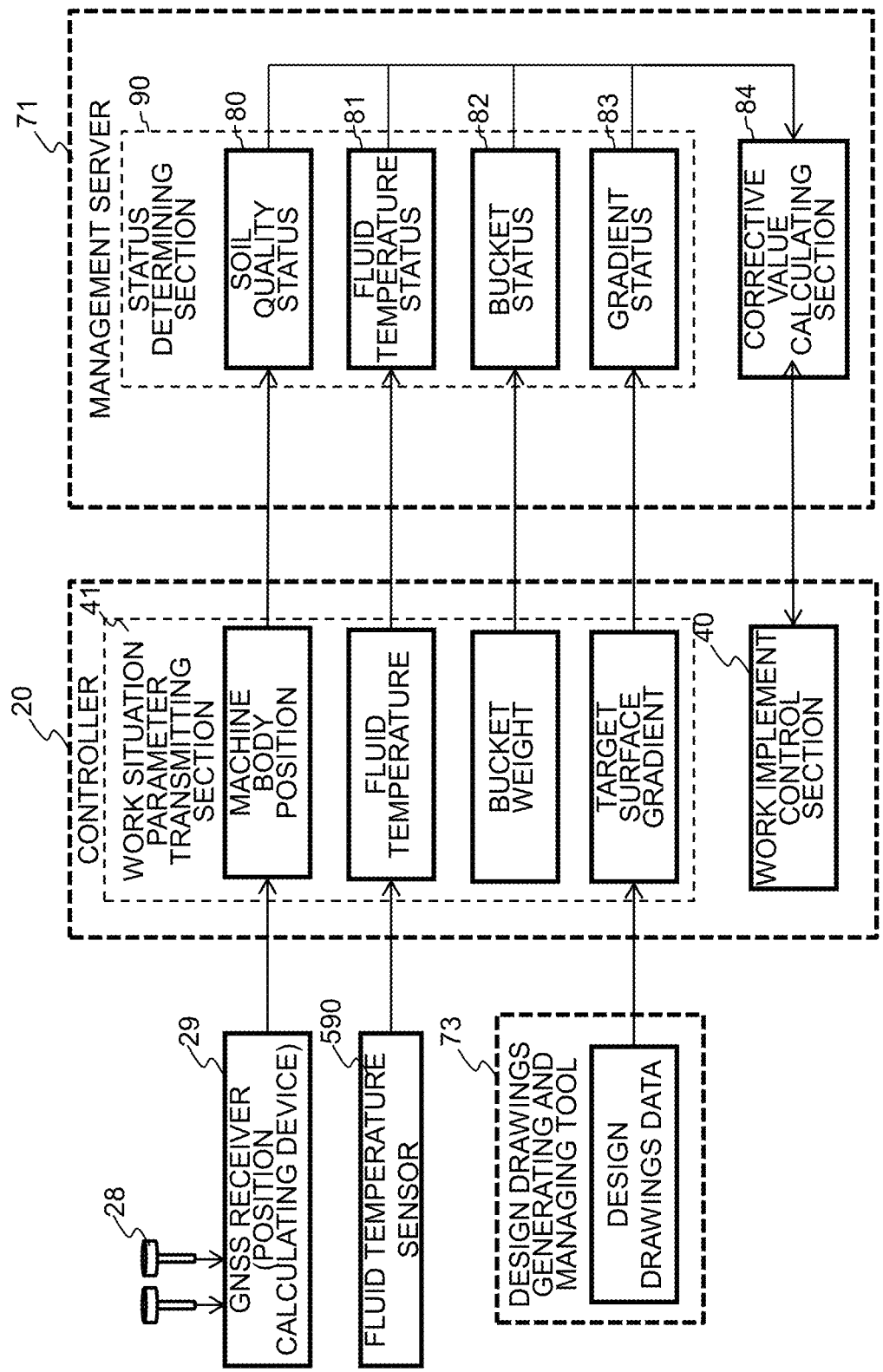
FIG. 2 is a functional block diagram illustrating a processing sequence executed by a controller 20 of a hydraulic excavator 1 and a management server 71 illustrated in FIG. 1.

FIG. 2 is a functional block diagram illustrating a processing sequence, which is classified into a plurality of blocks from a functional standpoint, that is executed by the controller 20 of the hydraulic excavator 1 and the management server 71 illustrated in FIG. 1.

Each of the controller 20 and the management server 71 includes an arithmetic processing unit (e.g., a CPU), a storage device (e.g., a semiconductor memory such as a ROM, a RAM, or the like), and an interface (input/output device) (all not depicted). The arithmetic processing unit executes programs (software) stored in advance in the storage device, executes arithmetic processing on the basis of data prescribed in the programs and data input from the interface, and outputs signals (processed results) from the interface to external devices.

The controller 20 functions as a work situation parameter transmitting section 41 and a work implement control section 40 by executing programs (software) stored in the storage device.

The work situation parameter transmitting section 41 is a section that performs a process of acquiring parameters representing a work situation (work environment) of the hydraulic excavator 1 (work situation parameters) and transmitting the acquired parameters to the management server 71. According to the present embodiment, positional information on the hydraulic excavator 1 (used for acquiring soil quality information), temperature information on a hydraulic working fluid, weight information on the bucket 10 (see FIG. 3), and gradient information on a target surface are used as work situation parameters. However, work situation parameters are not limited to the above information, but other information may be added as work situation parameters. The work situation parameters are stored in the storage device of the controller 20 and thereafter transmitted through the communication device 25 to the management server 71.

The positional information (machine body position data) of the hydraulic excavator 1 is acquired from a global positioning satellite system antenna receiver (GNSS receiver) 29. The GNSS receiver 29 is connected to two GNSS antennas 28 mounted on an upper surface of the upper swing structure 12. The GNSS receiver 29 calculates positional information (machine body position data) of the hydraulic excavator 1 (machine body) on the basis of satellite signals received from a plurality of positioning satellites 72 by the two GNSS antennas 28, and transmits the calculated positional information on the hydraulic excavator 1 to the controller 20. The controller 20 transmits the received positional information via the communication link 70 (wireless communication device 25) to the management server 71. When the azimuth angle of the hydraulic excavator 1 is not required for machine control performed by the work implement control section 40, the hydraulic excavator 1 may have only one GNSS antenna 28.

The temperature information (fluid temperature data) of the hydraulic working fluid is acquired from a fluid temperature sensor 590 attached to a hydraulic working fluid tank 50 (see FIG. 4) and a fluid temperature sensor 590 attached to a pilot line 560 (see FIG. 4), the fluid temperature sensors 590 being connected to the controller 20. The controller 20 transmits the acquired temperature information on the hydraulic working fluid via the communication link 70 (wireless communication device 25) to the management server 71.

The weight information (weight data) of the bucket 10 is measured in advance and stored in the storage device of the controller 20. The controller 20 transmits the weight information on the bucket 10 via the communication link 70 (wireless communication device 25) to the management server 71.

The gradient information (gradient data) of a target surface can be acquired by extracting gradient information on the target surface from design drawings data generated by the design drawings generating and managing tool 73 and stored in the storage device of the controller 20. The controller 20 transmits the gradient information on the target surface via the communication link 70 (wireless communication device 25) to the management server 71.

The work implement control section 40 is a section that controls (executes machine control) at least one hydraulic actuator (e.g., the boom cylinder 5 (see FIG. 3)) for holding the operation locus of the bucket 10 (see FIG. 3) above a target surface, using a control command correction value transmitted from the management server 71. As described in detail later, an average claw tip error value may be transmitted from the work implement control section 40 (controller 20) to a correction value calculating section 84 of the management server 71.

In FIG. 2, the management server 71 functions as a status determining section 90 and a correction value calculating section 84 by executing programs stored in the storage device.

The status determining section 90 includes a soil quality status determining section 80 for identifying soil quality data at a position based on machine body position data transmitted from the controller 20 (work situation parameter transmitting section 41) and determining a status (division) of the soil quality, a fluid temperature status determining section 81 for determining a status (division) of a fluid temperature based on fluid temperature data transmitted from the controller 20 (work situation parameter transmitting section 41), a bucket status determining section 82 for determining a status (division) of the weight of the bucket 10 based on weight data transmitted from the controller 20 (work situation parameter transmitting section 41), and a gradient status determining section 83 for determining a status (division) of the gradient of a target surface based on gradient data transmitted from the controller 20 (work situation parameter transmitting section 41).

The correction value calculating section 84 identifies a work situation pattern based on a combination of the statuses of work situation parameters determined by the status determining section 90, and calculates a control command correction value corresponding to the identified work situation pattern. The control command correction value database 85 (see FIG. 13) is used in calculating a control command correction value. The control command correction value calculated by the correction value calculating section 84 is transmitted via the communication link 70 to the controller 20 (work implement control section 40) of the hydraulic excavator 1.

<Hydraulic Excavator 1>

Figure 3:
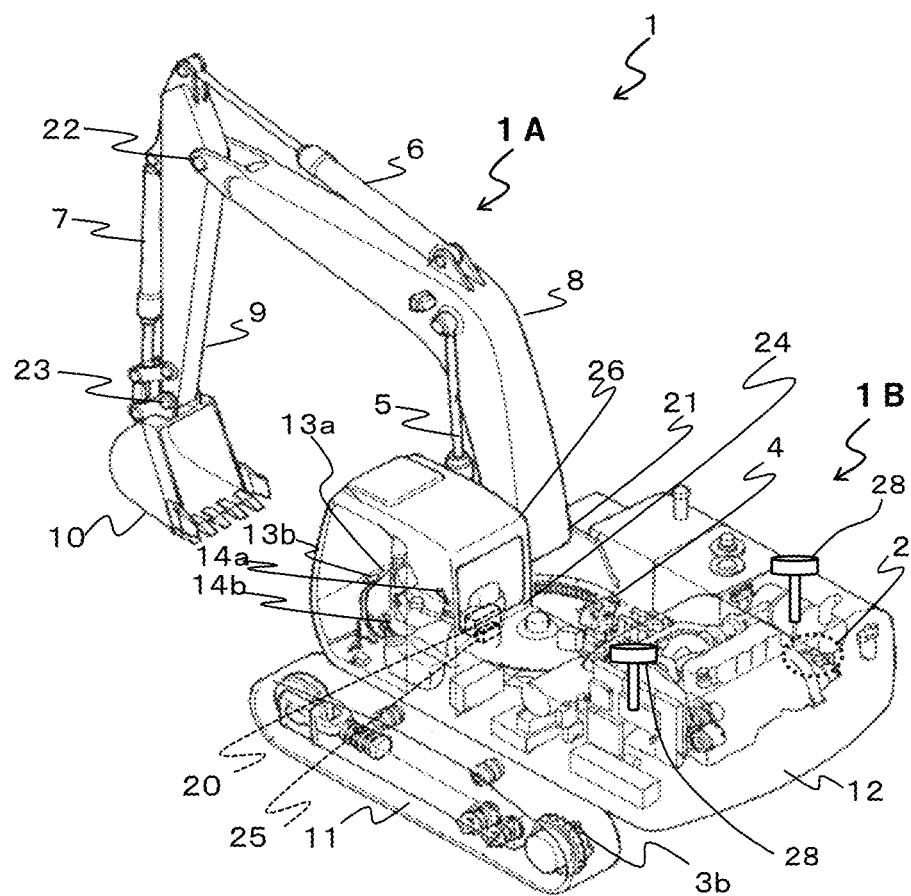
FIG. 3 is a view illustrating the configuration of the hydraulic excavator 1 according to the embodiment of the present invention.
Figure 4:
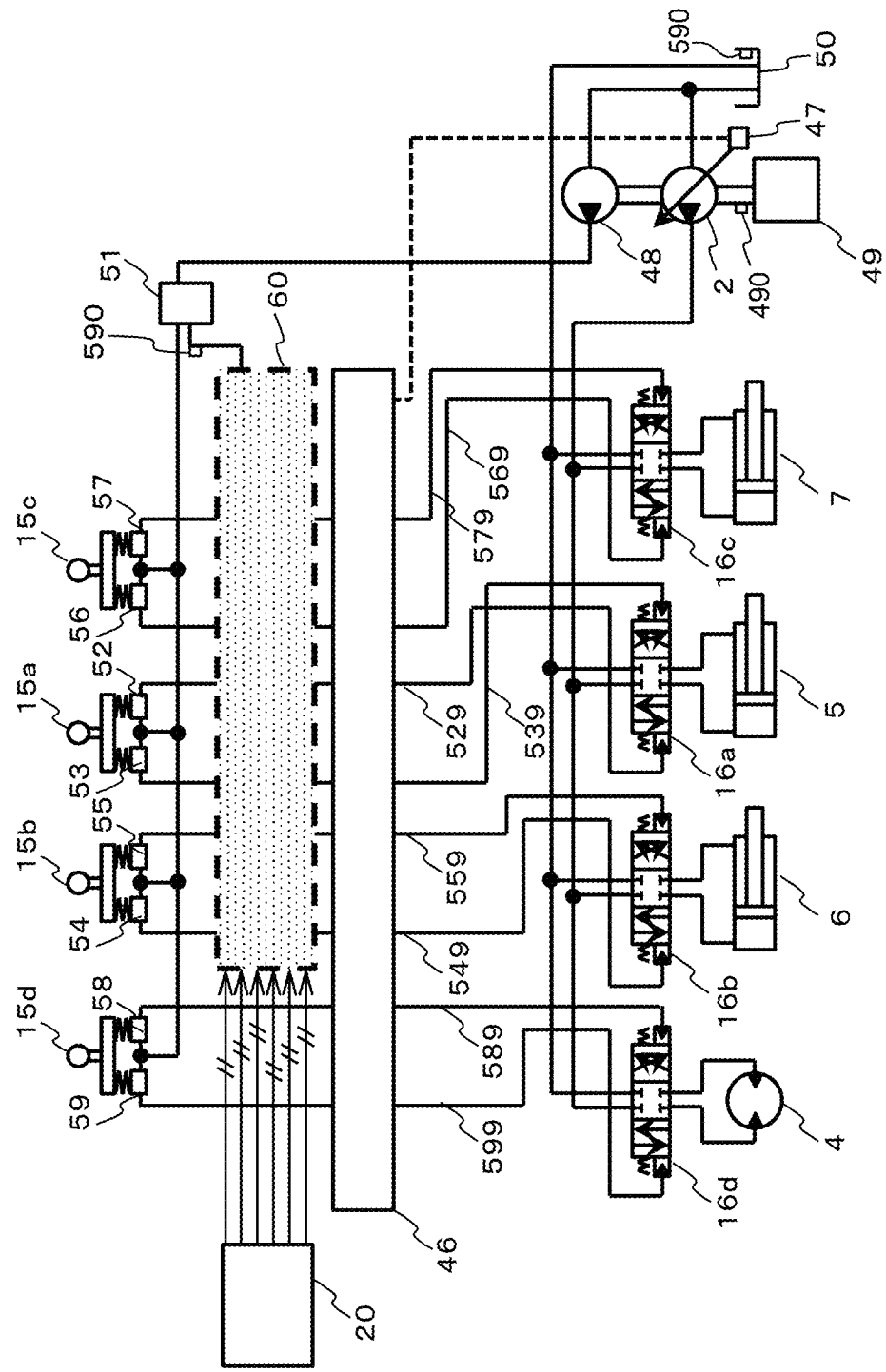
FIG. 4 is a diagram illustrating the controller 20 of the hydraulic excavator according to the embodiment of the present invention together with a hydraulic drive system.

FIG. 3 is a view illustrating the configuration of the hydraulic excavator 1 according to the embodiment of the present invention, and FIG. 4 is a diagram illustrating the controller 20 of the hydraulic excavator according to the embodiment of the present invention together with a hydraulic drive system. In FIG. 3, the hydraulic excavator 1 includes a multi-joint front work implement 1A for forming a target surface with the bucket 10 and a machine body 1B. The machine body 1B includes a lower track structure 11 and an upper swing structure 12 swingably mounted on the lower track structure 11. The front work implement 1A includes a plurality of coupled front members (a boom 8, an arm 9, and the bucket 10) that each pivot in vertical directions. The boom 8 of the front work implement 1A has a proximal end supported on a front portion of the upper swing structure 12 (machine body 1B).

The boom 8, the arm 9, the bucket 10, the upper swing structure 12, and the lower track structure 11 act as driven members that are driven respectively by a boom cylinder 5, an arm cylinder 6, a bucket cylinder 7, a swing hydraulic motor 4, and right and left track hydraulic motors 3a (not depicted) and 3b. Operation instructions for these driven members 8, 9, 10, 12, and 11 are output as the operator operates a right track lever 13a, a left track lever 13b, a right control lever 14a, and a left control lever 14b that are mounted in a cabin on the upper swing structure 12. The right track lever 13a instructs the right track hydraulic motor 3a to operate, the left track lever 13b instructs the left track hydraulic motor 3b to operate, the right control lever 14a instructs the boom cylinder 5 and the bucket cylinder 7 to operate, and the left control lever 14b instructs the arm cylinder 6 and the swing hydraulic motor 4 to operate. The track levers 13a and 13b and the control levers 14a and 14b may be referred to collectively as operation devices 15. FIG. 4 illustrates an operation device 15a of the right control lever 14a for operating the boom cylinder 5, an operation device 15b of the right control lever 14a for operating the arm cylinder 6, an operation device 15c of the left control lever 14b for operating the bucket cylinder 7, and an operation device 15d of the of the left control lever 14b for operating the swing hydraulic motor 4.

The operation devices 15 that are disposed in the cabin of the hydraulic excavator 1 are of the hydraulic pilot type, and supply pilot pressures (also referred to as control pressures) depending on their operation amounts (e.g., lever strokes) and directions in which they are operated to flow control valves 16a through 16d (see FIG. 4) associated with the respective operation devices 15, thereby actuating the flow control valves 16a through 16d. The operation devices and flow control valves for the track hydraulic motors are omitted from illustration in FIG. 4.

A hydraulic fluid delivered from a hydraulic pump 2 is supplied through the flow control valves 16a, 16b, 16c, and 16d (see FIG. 4) to hydraulic actuators such as the swing hydraulic motor 4, the boom cylinder 5, the arm cylinder 6, and the bucket cylinder 7. The boom cylinder 5, the arm cylinder 6, and the bucket cylinder 7 are extended or contracted by the supplied hydraulic fluid, the boom 8, the arm 9, and the bucket 10 are pivoted, and the position and the posture of the bucket 10 are changed. The swing hydraulic motor 4 is rotated by the supplied hydraulic fluid, swinging the upper swing structure 12 to the left or right with respect to the lower track structure 11. The supplied hydraulic fluid also rotates the right track hydraulic motor 3a and the left track hydraulic motor 3b, and then the lower track structure 11 is travelled.

In order to measure angles through which the boom 8, the arm 9, and the bucket 10 are pivoted, a boom angle sensor 21 is attached to a pin coupling the upper swing structure 12 and the boom 8 (hereinafter referred to as a "boom pin"), an arm angle sensor 22 is attached to a pin coupling the boom 8 and the arm 9 (hereinafter referred to as an "arm pin"), and a bucket angle sensor 23 is attached to a pin coupling the arm 9 and the bucket 10 (hereinafter referred to as a "bucket pin"). A machine body inclination angle sensor 24 for detecting an angle of inclination of the upper swing structure 12 (machine body 1B) with respect to a reference plane (e.g., a horizontal plane) is attached to the upper swing structure 12.

<Hydraulic Drive System>

In FIG. 4, the hydraulic pump 2 and a pilot pump 48 are driven by a prime mover (engine) 49. A hydraulic fluid supplied from the hydraulic pump 2 drives the hydraulic actuators including the boom cylinder 5 and the swing hydraulic motor 4. A hydraulic fluid supplied from the pilot pump 48 drives the flow control valves 16.

The hydraulic fluid delivered from the hydraulic pump 2 is supplied through the flow control valves 16a through 16d to the hydraulic actuators including the boom cylinder 5, the arm cylinder 6, and the bucket cylinder 7. The hydraulic fluid supplied to the hydraulic actuators is discharged through the flow control valves 16a through 16d to a tank 50. The fluid temperature sensor 590 for detecting the temperature of the hydraulic working fluid is disposed in the tank 50.

The pilot pump 48 is connected to a lock valve 51. In response to an operation of a gate lock lever, not depicted, by the operator, the lock valve 51 is released to allow the hydraulic fluid from the pilot pump 48 to flow downstream of the lock valve 51. The lock valve 51 has a downstream side connected to a boom raising pilot pressure control valve 52, a boom lowering pilot pressure control valve 53, an arm crowding pilot pressure control valve 54, an arm dumping pilot pressure control valve 55, a bucket crowding pilot pressure control valve 56, a bucket dumping pilot pressure control valve 57, a right swinging pilot pressure control valve 58, and a left swinging pilot pressure control valve 59, etc.

The boom raising pilot pressure control valve 52 and the boom lowering pilot pressure control valve 53 can be operated by the boom operation device 15a. The arm crowding pilot pressure control valve 54 and the arm dumping pilot pressure control valve 55 can be operated by the arm operation device 15b. The bucket crowding pilot pressure control valve 56 and the bucket dumping pilot pressure control valve 57 can be operated by the bucket operation device 15c. The right swinging pilot pressure control valve 58 and the left swinging pilot pressure control valve 59 can be operated by the swing operation device 15d.

A hydraulic pressure control unit 60 for performing machine control is connected downstream of the boom raising pilot pressure control valve 52, the boom lowering pilot pressure control valve 53, the arm crowding pilot pressure control valve 54, the arm dumping pilot pressure control valve 55, the bucket crowding pilot pressure control valve 56, and the bucket dumping pilot pressure control valve 57. The hydraulic pressure control unit 60 includes various control valves for controlling pilot pressures depending on control commands (corrected control commands) output from the controller 20 thereby to perform machine control.

A shuttle block 46 is connected downstream of the hydraulic pressure control unit 60. Downstream of the shuttle block 46, there are connected a boom raising pilot line 529, a boom lowering pilot line 539, an arm crowding pilot line 549, an arm dumping pilot line 559, a bucket crowding pilot line 569, a bucket dumping pilot line 579, a right swinging pilot line 589, and a left swinging pilot line 599. The boom flow control valve 16a is connected downstream of the boom raising pilot line 529 and the boom lowering pilot line 539. The arm flow control valve 16b is connected downstream of the arm crowding pilot line 549 and the arm dumping pilot line 559. The bucket flow control valve 16c is connected downstream of the bucket crowding pilot line 569 and the bucket dumping pilot line 579. The swinging flow control valve 16d is connected downstream of the right swinging pilot line 589 and the left swinging pilot line 599. The flow control valves 16a through 16d are arranged to control flow rates depending on operation amounts of the operation devices 15a through 15d.

A regulator 47 attached to the hydraulic pump 2 is connected downstream of the shuttle block 46. The regulator 47 changes the delivery rate of the fluid delivered under pressure from the hydraulic pump 2 depending on operation amounts of the operation devices 15.

The fluid temperature sensor 590 is attached to the pilot line 560 that interconnects the tank 50, the lock valve 51, and the hydraulic pressure control unit 60, the fluid temperature sensor 590 detecting the temperature of the hydraulic working fluids therein. An engine speed sensor 490 for detecting an engine speed of the prime mover 49 is attached to the prime mover 49. Detected values from the fluid temperature sensor 590 and the engine speed sensor 490 are output to the controller 20.

<Hydraulic Pressure Control Unit 60>

Figure 5:
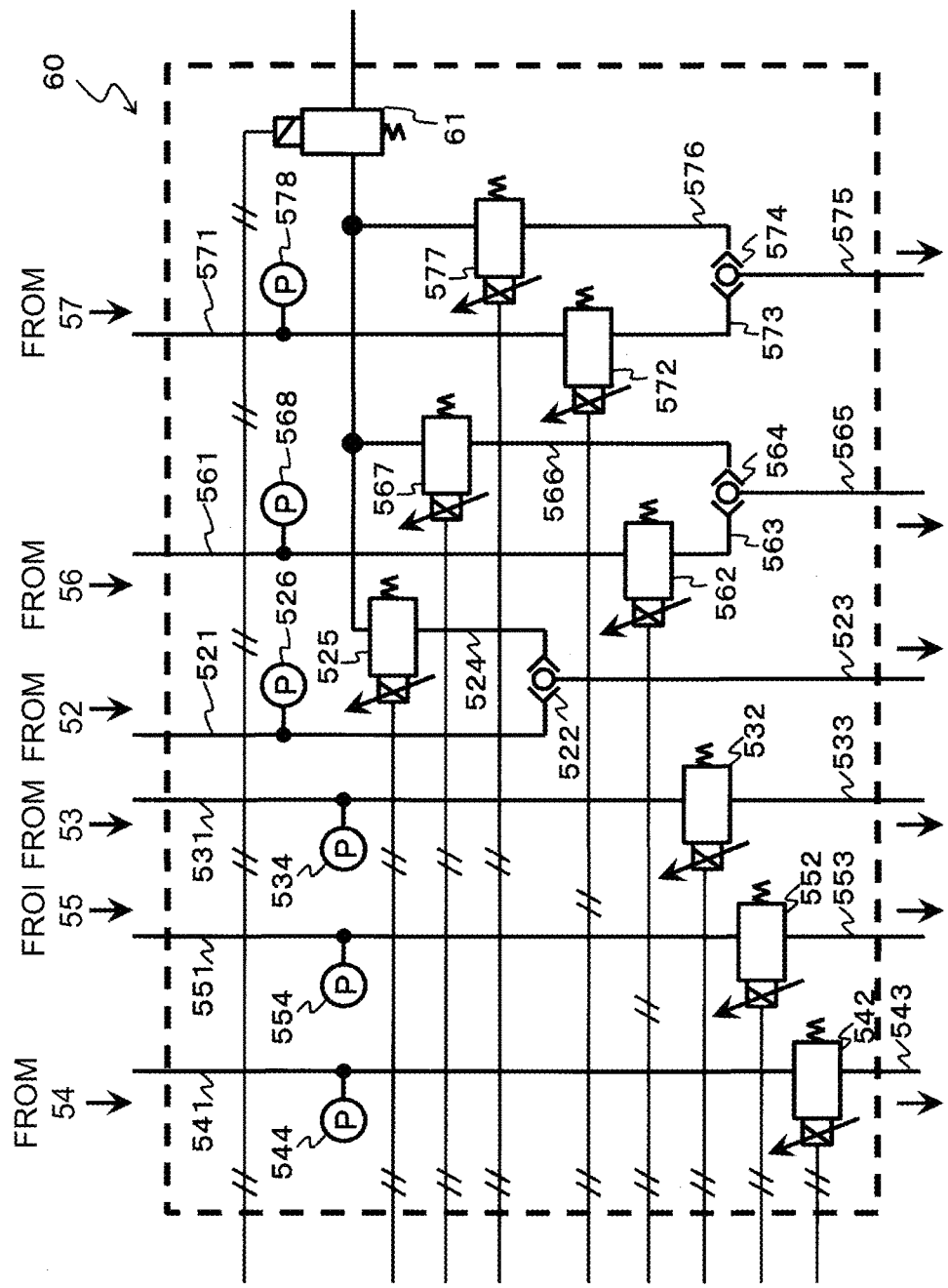
FIG. 5 is a detailed diagram of a hydraulic pressure control unit 60 illustrated in FIG. 4.

FIG. 5 is a detailed diagram of the hydraulic pressure control unit 60 illustrated in FIG. 4. The hydraulic pressure control unit 60 includes a solenoid cutoff valve 61. The solenoid cutoff valve 61 has its opening closed when de-energized and fully opened when energized. When machine control is to be performed, the solenoid cutoff valve 61 is energized by a command from the controller 20. When machine control is not to be performed, the solenoid cutoff valve 61 is de-energized by a command from the controller 20.

A pilot line 521, a shuttle valve 522, and a pilot line 523 are connected downstream of the boom raising pilot pressure control valve 52 and arranged successively downstream. The shuttle valve 522 has two inlet ports and one outlet port, and connects one of the two inlet ports that has a higher pressure to the outlet port. One of the inlet ports of the shuttle valve 522 is connected to the pilot line 521 and the outlet port thereof is connected to the pilot line 523. The other inlet port of the shuttle valve 522 is connected to a pilot line 524. The solenoid cutoff valve 61 and a solenoid proportional valve 525 are connected to the pilot line 524 and arranged successively downstream. When a hydraulic fluid is supplied to the pilot line 524, the hydraulic fluid can be supplied to the pilot line 523 regardless of the state of the boom raising pilot pressure control valve 52. The solenoid proportional valve 525 has its opening closed when de-energized and fully opened when energized. The opening of the solenoid proportional valve 525 increases as an electric current supplied thereto increases. The opening of the solenoid proportional valve 525 depends on a control command from the controller 20. A pressure sensor 526 for detecting a boom raising pilot pressure applied by the operator is disposed upstream of the shuttle valve 522.

A pilot line 531, a solenoid proportional valve 532, and a pilot line 533 are connected downstream of the boom lowering pilot pressure control valve 53 and arranged successively downstream. The solenoid proportional valve 532 has its opening fully opened when de-energized and restricted when energized. The opening of the solenoid proportional valve 532 decreases as an electric current supplied thereto increases. The opening of the solenoid proportional valve 532 depends on a control command from the controller 20. Even if the operator operates to lower the boom 8, the opening of the solenoid proportional valve 532 can reduce or eliminate the operation amount to lower the boom 8. A pressure sensor 534 for detecting a boom lowering pilot pressure by the operator's operation is disposed between the pilot line 531 and the solenoid proportional valve 532.

A pilot line 541, a solenoid proportional valve 542, and a pilot line 543 are connected downstream of the arm crowding pilot pressure control valve 54 and arranged successively downstream. The solenoid proportional valve 542 has its opening fully opened when de-energized and restricted when energized. The opening of the solenoid proportional valve 542 decreases as an electric current supplied thereto increases. The opening of the solenoid proportional valve 542 depends on a control command from the controller 20. Even if the operator operates to perform an arm crowding action, the opening of the solenoid proportional valve 542 can reduce or eliminate the operation amount to perform the arm crowding action. A pressure sensor 544 for detecting an arm crowding pilot pressure by the operator's operation is disposed between the pilot line 541 and the solenoid proportional valve 542.

A pilot line 551, a solenoid proportional valve 552, and a pilot line 553 are connected downstream of the arm dumping pilot pressure control valve 55 and arranged successively downstream. The solenoid proportional valve 552 has its opening fully opened when de-energized and restricted when energized. The opening of the solenoid proportional valve 552 decreases as an electric current supplied thereto increases. The opening of the solenoid proportional valve 552 depends on a control command from the controller 20. Even if the operator operates to perform an arm dumping operation, the opening of the solenoid proportional valve 552 can reduce or eliminate the operation amount to perform the arm dumping operation. A pressure sensor 554 for detecting an arm dumping pilot pressure by the operator's operation is disposed between the pilot line 551 and the solenoid proportional valve 552.

A pilot line 561, a solenoid proportional valve 562, a pilot line 563, a shuttle valve 564, and a pilot line 565 are connected downstream of the bucket crowding pilot pressure control valve 56 and arranged successively downstream. The solenoid proportional valve 562 has its opening fully opened when de-energized and restricted when energized. The opening of the solenoid proportional valve 562 decreases as an electric current supplied thereto increases. The opening of the solenoid proportional valve 562 depends on a control command from the controller 20. Even if the operator operates to perform a bucket crowding operation, the solenoid proportional valve 562 can reduce or eliminate the operation amount to perform the bucket crowding operation. A pressure sensor 568 for detecting a bucket crowding pilot pressure by the operator's operation is disposed between the pilot line 561 and the solenoid proportional valve 562.

The shuttle valve 564 has two inlet ports and one outlet port, and connects one of the two inlet ports that has a higher pressure to the outlet port. One of the inlet ports of the shuttle valve 564 is connected to the pilot line 563 and the outlet port thereof is connected to the pilot line 565. The other inlet port of the shuttle valve 564 is connected to a pilot line 566. The solenoid cutoff valve 61 and a solenoid proportional valve 567 are connected to the pilot line 566 and arranged successively downstream. When a hydraulic fluid is supplied to the pilot line 566, the hydraulic fluid can be supplied to the pilot line 565 regardless of the state of the bucket crowding pilot pressure control valve 56. The solenoid proportional valve 567 has its opening closed when de-energized and opened when energized. The opening of the solenoid proportional valve 567 increases as an electric current supplied thereto increases. The opening of the solenoid proportional valve 567 depends on a control command from the controller 20.

A pilot line 571, a solenoid proportional valve 572, a pilot line 573, a shuttle valve 574, and a pilot line 575 are connected downstream of the bucket dumping pilot pressure control valve 57 and arranged successively downstream. The solenoid proportional valve 572 has its opening fully opened when de-energized and restricted when energized. The opening of the solenoid proportional valve 572 decreases as an electric current supplied thereto increases. The opening of the solenoid proportional valve 572 depends on a control command from the controller 20. Even if the operator operates to perform a bucket dumping operation, the solenoid proportional valve 572 can reduce or eliminate the operation amount to perform the bucket dumping operation. A pressure sensor 578 for detecting a bucket dumping pilot pressure by the operator's operation is disposed between the pilot line 571 and the solenoid proportional valve 572.

The shuttle valve 574 has two inlet ports and one outlet port, and connects one of the two inlet ports that has a higher pressure to the outlet port. One of the inlet ports of the shuttle valve 574 is connected to the pilot line 573 and the outlet port thereof is connected to the pilot line 575. The other inlet port of the shuttle valve 574 is connected to a pilot line 576. The solenoid cutoff valve 61 and a solenoid proportional valve 577 are connected to the pilot line 576 and arranged successively downstream. When a hydraulic fluid is supplied to the pilot line 576, the hydraulic fluid can be supplied to the pilot line 575 regardless of the state of the bucket dumping pilot pressure control valve 57. The solenoid proportional valve 577 has its opening closed when de-energized and opened when energized. The opening of the solenoid proportional valve 577 increases as an electric current supplied thereto increases. The opening of the solenoid proportional valve 577 depends on a control command from the controller 20.

<Work Implement Control Section 40 of Controller 20>

Figure 6:
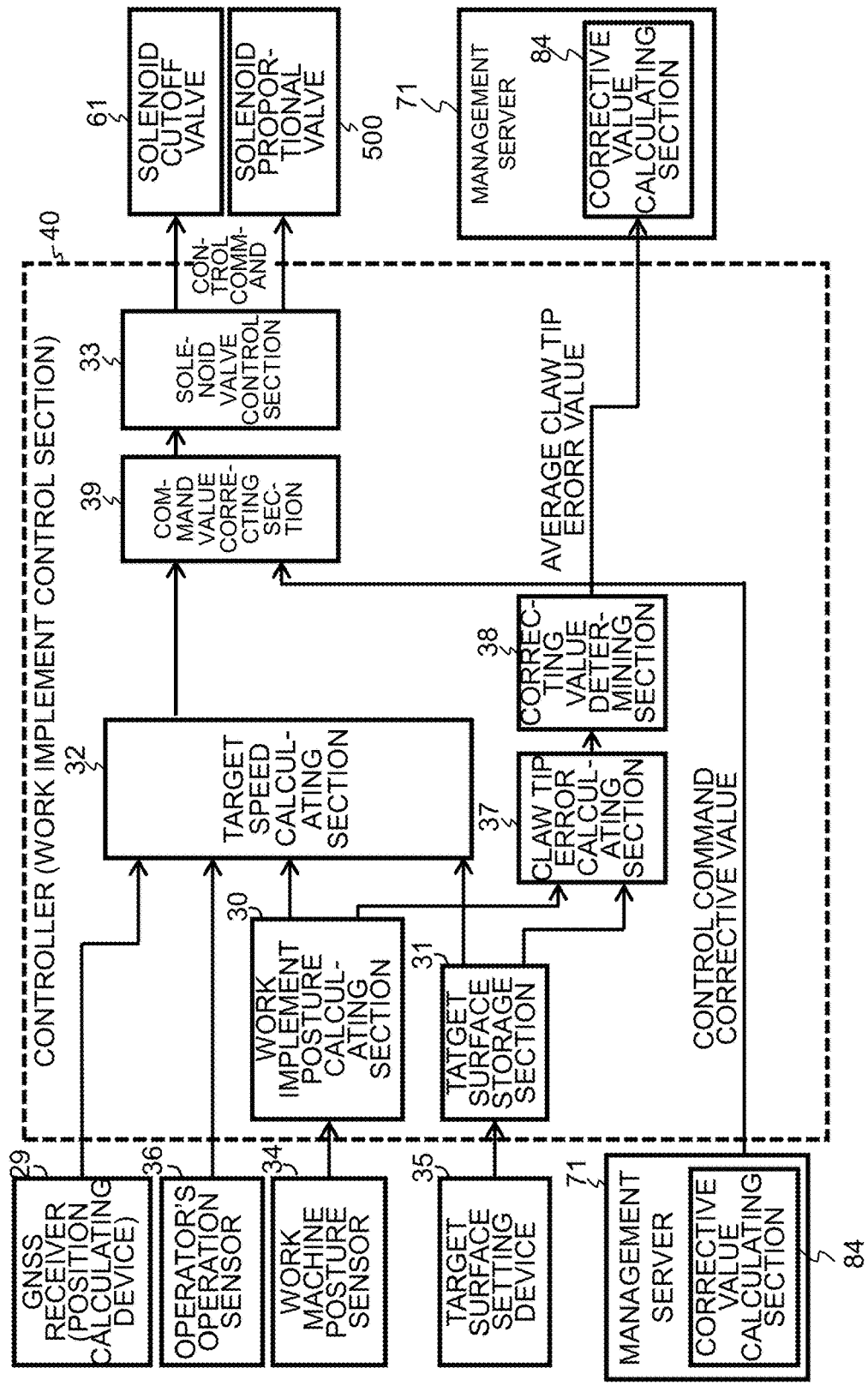
FIG. 6 is a functional block diagram illustrating a processing sequence, which is classified into a plurality of blocks, that is executed by a work implement control section 40 of the controller 20.

FIG. 6 is a functional block diagram illustrating a processing sequence, which is classified into a plurality of blocks, that is executed by the work implement control section 40 of the controller 20. As illustrated in FIG. 6, the processing sequence executed by the work implement control section 40 is divided into a work implement posture calculating section 30, a target surface storage section 31, a target velocity calculating section 32, a solenoid valve control section 33, a claw tip error calculating section 37, a correction value determining section 38, and a command value correcting section 39. To the controller 20, there are connected a work implement posture sensor 34, a target surface setting device 35, an operator's operation sensor 36, the solenoid cutoff valve 61, the solenoid proportional valves 572, 577, 567, 562, 525, 532, 552, and 542. These solenoid proportional valves may also be referred to collectively as solenoid proportional valves 500.

The work implement posture sensor 34 includes the boom angle sensor 21, the arm angle sensor 22, the bucket angle sensor 23, and the machine body inclination angle sensor 24. The target surface setting device 35 is an interface capable of inputting information regarding a target surface 75, and corresponds to the above-described design drawings generating and managing tool 73, for example. The operator may manually enter information regarding the target surface 75 into the target surface setting device 35. Alternatively, the coordinates of the hydraulic excavator 1 in a global coordinate system that have been calculated by the GNSS receiver 29 may be entered into the target surface setting device 35, which may extract target surface data around the entered coordinates and output the extracted target surface data to the controller 20. The operator's operation sensor 36 includes the pressure sensors 578, 568, 526, 534, 554, and 544 that acquire pilot pressures applied by the operator operating the operation devices 15.

The work implement posture calculating section 30 calculates the position of a bucket tip end (bucket claw tip) CP1 (see FIG. 8) that acts as a control point according to the present embodiment in the global coordinate system and the postures of the front members 8, 9, and 10 of the front work implement 1A in the global coordinate system. The work implement posture calculating section 30 may calculate the position and the postures according to known processes. For example, the work implement posture calculating section 30 calculates the coordinate values in the global coordinate system of the origin P0 of a local coordinate system (e.g., a coordinate system established around the center of swinging movement of the upper swing structure 12) and posture information and orientation information on the track structure 11 and the swing structure 12 in the global coordinate system from a plurality of satellite signals received by the two GNSS antennas 28. Then, the work implement posture calculating section 30 calculates the position of the bucket tip end CP1 as the control point in the global coordinate system and the postures of the front members 8, 9, and 10 of the front work implement 1A in the global coordinate system, using the calculated coordinate values and posture information and orientation information, the information on the angles from the work implement posture sensor 34, the coordinate values of the boom pin in the local coordinate system, the boom length, the arm length, and the bucket length. The coordinate values of the control point of the front work implement 1A may be measured by an external measuring device such as a laser surveying instrument and acquired from communication with the external measuring device.

The target surface storage section 31 stores positional information (target surface data) of the target surface 75 in the global coordinate system that is calculated on the basis of the information from the target surface setting device 35. According to the present embodiment, a cross-sectional shape of three-dimensional data of a target surface along a plane on which the front members 8, 9, and 10 of the front work implement 1A move is used as the target surface 75 (two-dimensional target surface). The positional information on the target surface 75 around the hydraulic excavator 1 may be acquired from the design drawings generating and managing tool 73 by way of communication on the basis of the positional information on the control point of the front work implement 1A in the global coordinate system, and stored in the target surface storage section 31.

The target velocity calculating section 32 is a section that calculates target velocities for the respective hydraulic cylinders 5, 6, and 7 depending on a distance D in order to limit an operable range of the front work implement 1A above and below the target surface 75 when the operation devices 15 are operated. According to the present embodiment, the target velocity calculating section 32 performs the following calculations.

First, the target velocity calculating section 32 calculates the distance D (see FIG. 8) between the control point of the front work implement 1A and the target surface 75 from the positional information on the control point of the front work implement 1A that has been calculated by the work implement posture calculating section 30 and the positional information on the target surface 75 that has been acquired from the target surface storage section 31.

Then, the target velocity calculating section 32 calculates a required velocity for the boom cylinder 5 (boom cylinder required velocity) from a voltage value (operation amount for the boom) input from the operation device 15a, calculates a required velocity for the arm cylinder 6 (arm cylinder required velocity) from a voltage value (operation amount for the arm) input from the operation device 15b, and calculates a required velocity for the bucket cylinder 7 (bucket cylinder required velocity) from a voltage value (operation amount for the bucket) input from the operation device 15c. The target velocity calculating section 32 calculates a velocity vector (required velocity vector) V0 of the front work implement 1A at the bucket tip end CP1 from the three required velocities and the postures of the respective front members 8 9, and 10 of the front work implement 1A that have been calculated by the work implement posture calculating section 30. Then, the target velocity calculating section 32 also calculates a velocity component V0z of the velocity vector V0 in the vertical direction normal to the target surface and a velocity component V0x of the velocity vector V0 in the horizontal direction parallel to the target surface.

Figure 7:
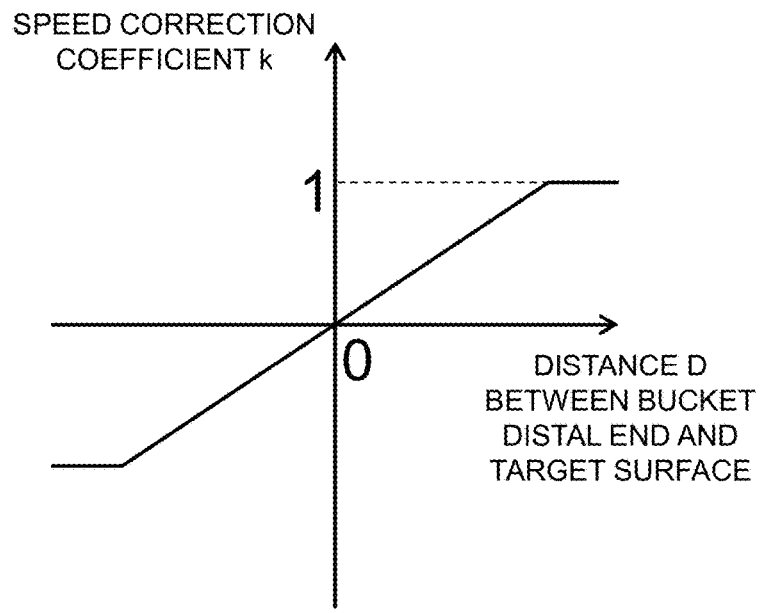
FIG. 7 is a graph illustrating the relation between a distance D between a bucket tip end CP1 and a target surface 75 and a velocity correction coefficient k.

Next, the target velocity calculating section 32 calculates a corrective coefficient k that is decided depending on the distance D. FIG. 7 is a graph illustrating the relation between the distance D between the bucket tip end CP1 and the target surface 75 and the velocity correction coefficient k. It is assumed that the distance D is positive when the bucket claw tip coordinates CP1 (the control point of the front work implement 1A) are positioned above the target surface 75 and negative when the bucket claw tip coordinates CP1 are positioned below the target surface 75. When the distance D is positive, the target velocity calculating section 32 outputs a positive corrective coefficient as a value equal to or smaller than 1, and when the distance D is negative, the target velocity calculating section 32 outputs a negative corrective coefficient as a value equal to or smaller than 1. The velocity vector is oriented in a positive direction when it approaches the target surface 75 from above the target surface 75.

Then, the target velocity calculating section 32 calculates a velocity component V1z by multiplying the velocity component V0z of the velocity vector V0 in the vertical direction normal to the target surface by the corrective coefficient k decided depending on the distance D. The target velocity calculating section 32 adds the velocity component V1z and the velocity component V0x of the velocity vector V0 in the horizontal direction parallel to the target surface, thereby calculating a combined velocity vector (required velocity vector) V1. The target velocity calculating section 32 then calculates a boom cylinder velocity, an arm cylinder velocity, and a bucket cylinder velocity that are capable of generating the combined velocity vector V1 as target velocities. In calculating the target velocities, the target velocity calculating section 32 may use the postures of the front members 8, 9, and 10 of the front work implement 1A that have been calculated by the work implement posture calculating section 30.

Figure 8:
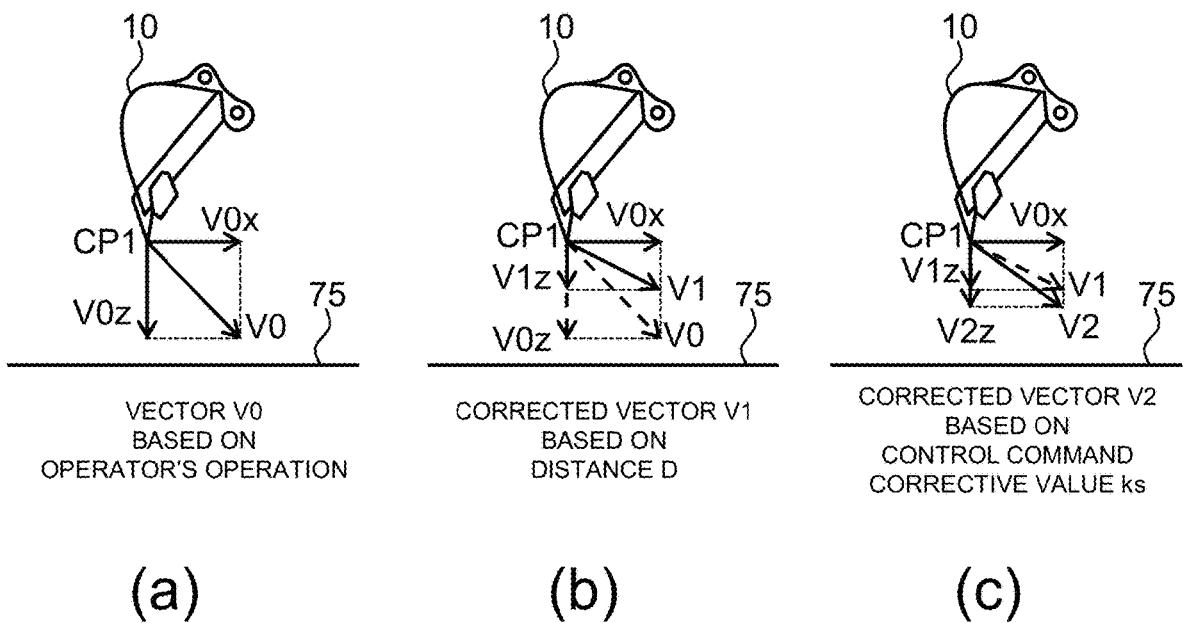
FIG. 8 depicts schematic diagrams illustrating velocity vectors before and after they are corrected depending on the distance D to the bucket tip end CP1.

FIG. 8 is a schematic diagram illustrating velocity vectors before and after they are corrected depending on the distance D to the bucket tip end CP1. The velocity component V0z (see (c) of FIG. 8) of the required velocity vector V0 in the vertical direction normal to the target surface is multiplied by the corrective coefficient k, obtaining the velocity component V1z (see (b) of FIG. 8), which is equal to or smaller than the velocity component V0z, in the vertical direction normal to the target surface The velocity component V1z and the velocity component V0x of the required velocity vector V0 in the horizontal direction parallel to the target surface are added to calculate the combined velocity vector V1. Then, an arm cylinder target velocity, a boom cylinder target velocity, and a bucket cylinder target velocity that are capable of generating the combined velocity vector V1 are calculated.

The command value correcting section 39 is a section that performs a process of correcting the arm cylinder target velocity, the boom cylinder target velocity, and the bucket cylinder target velocity that have been calculated by the target velocity calculating section 32, using a control command correction value ks transmitted from the management server 71. According to the present embodiment, the command value correcting section 39 multiplies the velocity component V1z (see (b) of FIG. 8) of the velocity vector V1 in the vertical direction normal to the target surface by the control command correction value ks, calculating a velocity component V2z (see (c) of FIG. 8). Then, the command value correcting section 39 adds the velocity component V2z and the velocity component V0x of the velocity vector V0 in the horizontal direction parallel to the target surface, calculating a combined velocity vector (target velocity vector)

V2. The command value correcting section 39 calculates a boom cylinder velocity, an arm cylinder velocity, and a bucket cylinder velocity that are capable of generating the combined velocity vector V2 as corrected target velocities.

The solenoid valve control section 33 calculates control commands (corrected control commands) for the solenoid proportional valves 500 on the basis of the target velocities for the respective hydraulic cylinders 5, 6, and 7 that have been calculated by the command value correcting section 39, and outputs the calculated control commands to the corresponding solenoid proportional valves 500. The flow control valves (respective spools) 16a, 16b, and 16c are now controlled to operate the respective hydraulic cylinders 5, 6, and 7 at the velocities calculated by the command value correcting section 39, keeping the operation locus of the bucket 10 on the target surface.

When a machine control state becomes invalid, the solenoid valve control section 33 issues commands to the solenoid cutoff valve 61 and the solenoid proportional valves 500 against control intervention. Specifically, the solenoid valve control section 33 fully closes the opening of the solenoid cutoff valve 61, interrupting the hydraulic fluid flowing from the pilot pump 48 through the lock valve 51 into the hydraulic pressure control unit 60. The solenoid valve control section 33 fully opens the solenoid proportional valves 532, 542, 552, 562, and 572 whose opening is fully opened when de-energized, inhibiting the intervention in the pilot pressures by the operator's operation. The solenoid valve control section 33 fully closes the solenoid proportional valves 525, 567, and 577 whose opening is fully closed when de-energized, inhibiting the front work implement 1A from operating in the absence of operator's operation.

<Management Server 71>

Details of a processing sequence executed by the management server 71 will be described below.

Figure 9:
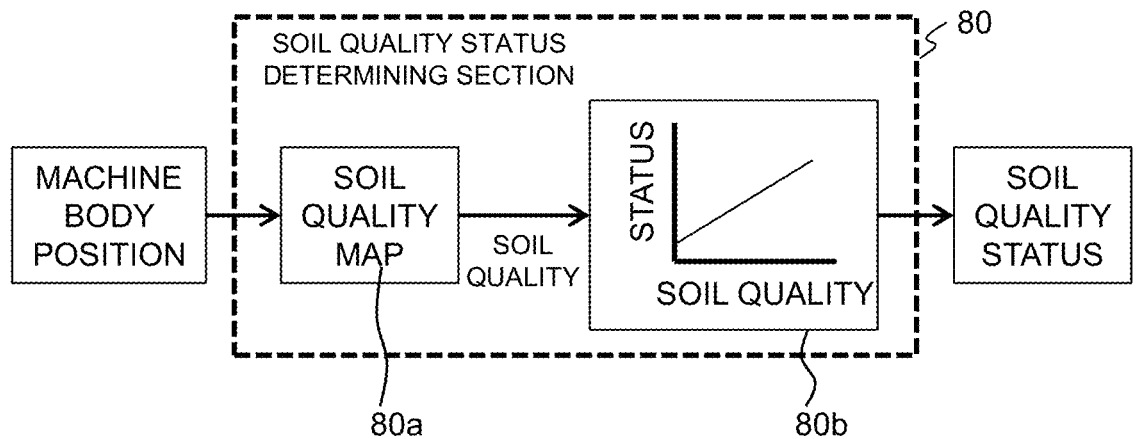
FIG. 9 is a diagram illustrating a processing sequence executed by a soil quality status determining section 80 of the management server 71.

FIG. 9 is a diagram illustrating a processing sequence executed by the soil quality status determining section 80. The soil quality status determining section 80 checks machine body position data transmitted from the controller 20 against a soil quality map 80a of the work site registered in the management server 71 in advance and calculates a soil quality at the current site of the hydraulic excavator 1. Then, the soil quality status determining section 80 computes a soil quality status corresponding to the soil quality calculated according to the soil quality map 80a, and transmits the calculated soil quality to the correction value calculating section 84. As illustrated in FIG. 14, the soil quality status according to the present embodiment has three divisions, that is, soft, medium, and hard.

Figure 10:
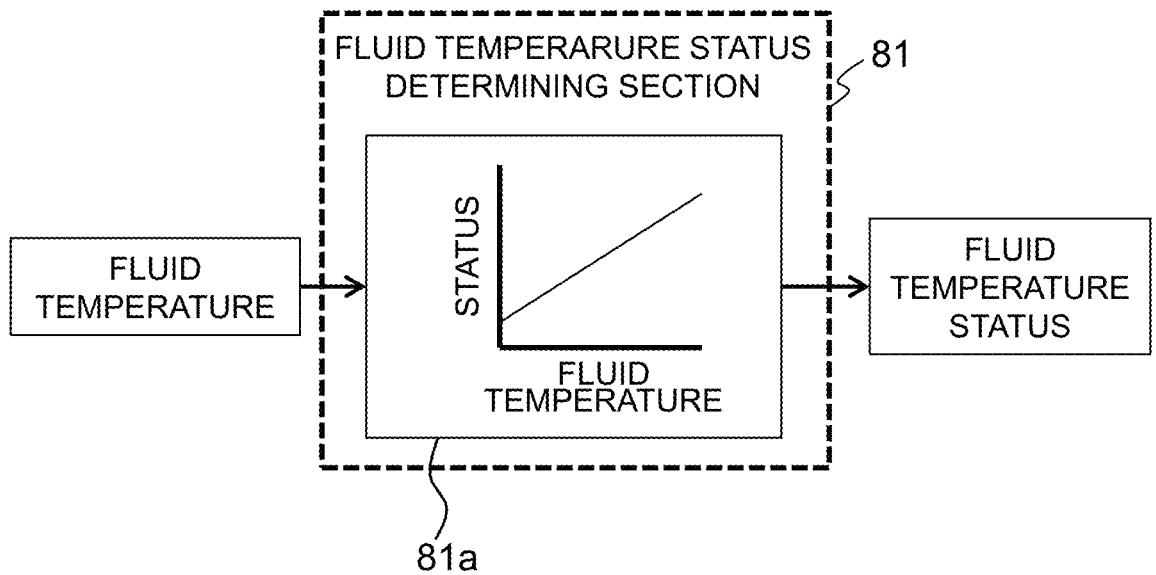
FIG. 10 is a diagram illustrating a processing sequence executed by a fluid temperature status determining section 81 of the management server 71.

FIG. 10 is a diagram illustrating a processing sequence executed by the fluid temperature status determining section 81. The fluid temperature status determining section 81 computes a fluid temperature status corresponding to fluid temperature data transmitted from the controller 20, using the fluid temperature data transmitted from the controller 20 and a correlative table 81a representing a correlation between fluid temperature and fluid temperature statuses, and transmits the computed fluid temperature status to the correction value calculating section 84. As illustrated in FIG. 14, the fluid temperature status according to the present embodiment is divided into divisions, that is, low (low temperature), normal low (between normal temperature and low temperature), and normal (normal temperature).

Figure 11:
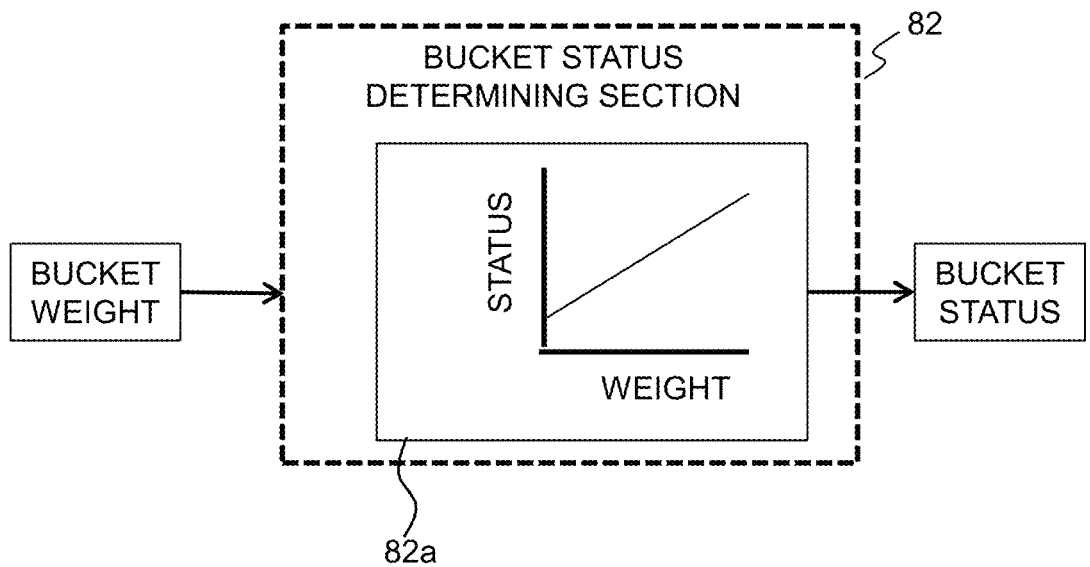
FIG. 11 is a diagram illustrating a processing sequence executed by a bucket status determining section 82 of the management server 71.

FIG. 11 is a diagram illustrating a processing sequence executed by the bucket status determining section 82. The bucket status determining section 82 computes a bucket status corresponding to weight data of the bucket 10 transmitted from the controller 20, using the weight data of the bucket 10 transmitted from the controller 20 and a correlative table 82a representing a correlation between bucket weights and bucket statuses, and transmits the computed bucket status to the correction value calculating section 84. As illustrated in FIG. 14, the bucket status according to the present embodiment has three divisions, that is, light, medium, and heavy.

Figure 12:
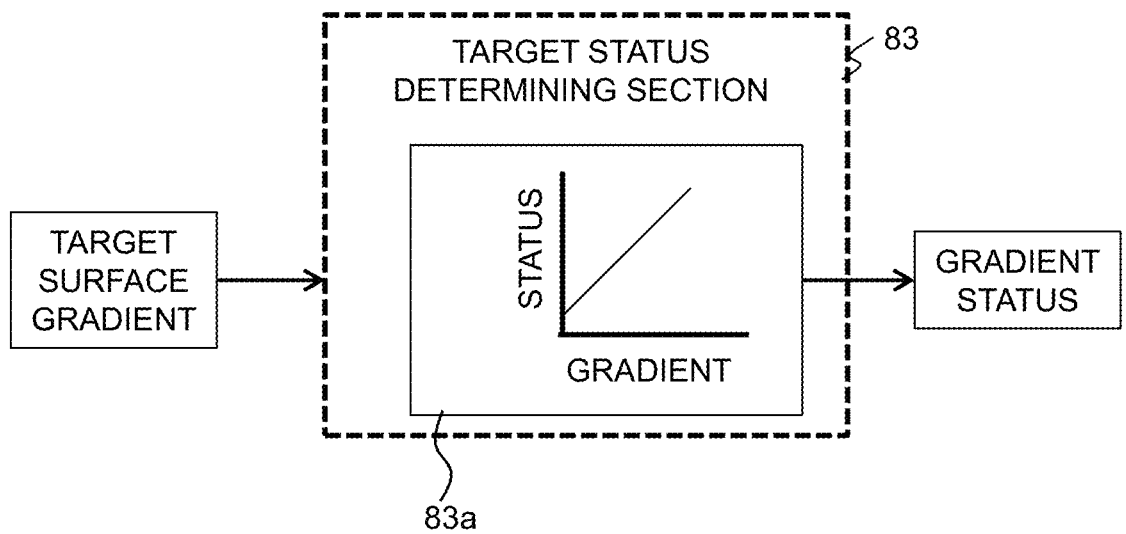
FIG. 12 is a diagram illustrating a processing sequence executed by a gradient status determining section 83 of the management server 71.

FIG. 12 is a diagram illustrating a processing sequence executed by the gradient status determining section 83. The gradient status determining section 83 computes a gradient status corresponding to gradient data of the target surface transmitted from the controller 20, using the gradient data of the target surface transmitted from the controller 20 and a correlative table 83a representing a correlation between target surface gradients and gradient statuses, and transmits the computed gradient status to the correction value calculating section 84. As illustrated in FIG. 14, the gradient status according to the present embodiment has three divisions, that is, down (downward gradient), horizontal (substantially horizontal), and upward (up gradient).

Figure 13:
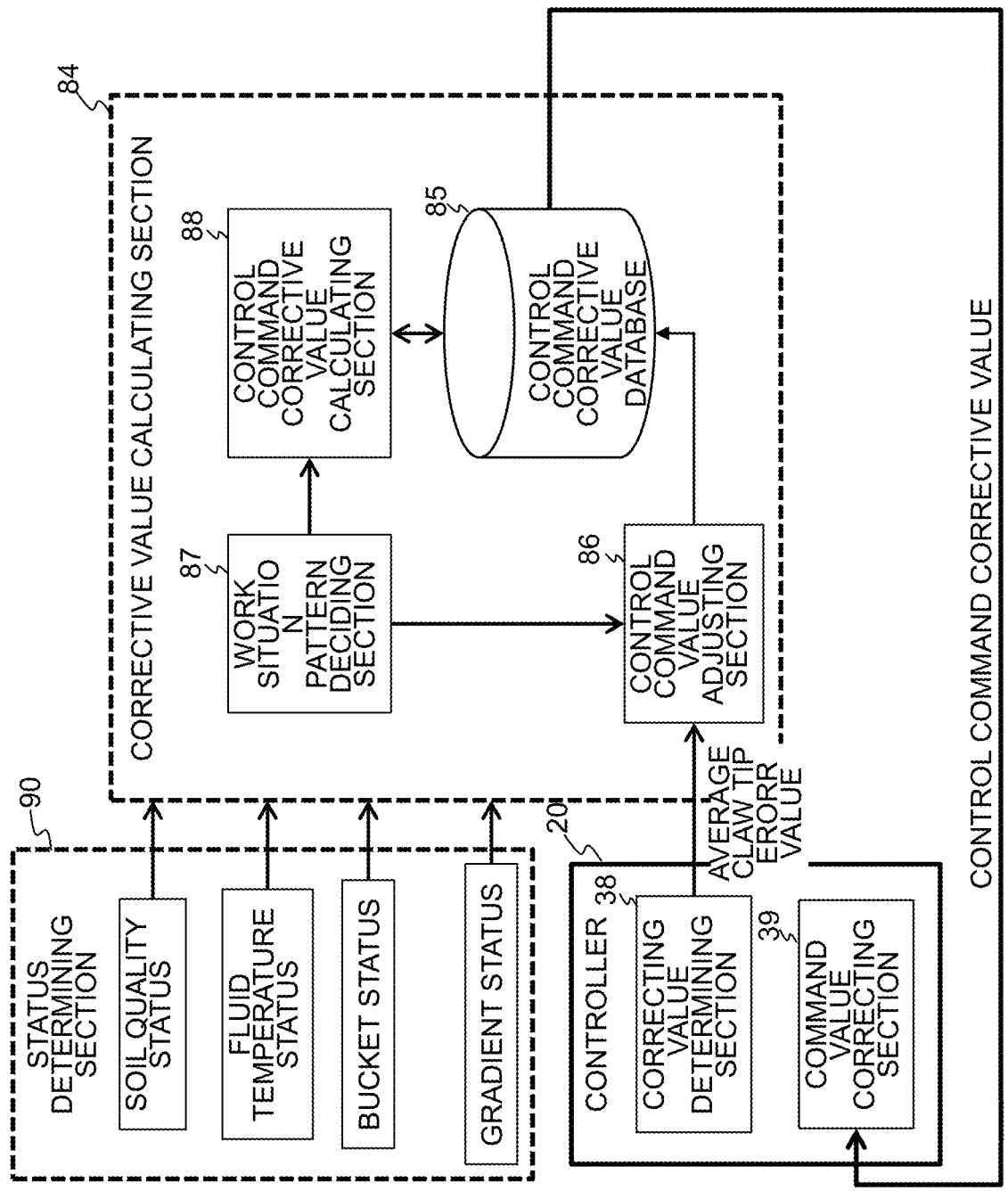
FIG. 13 is a functional block diagram illustrating a processing sequence, which is classified into a plurality of blocks, that is executed by a correction value calculating section 84 of the management server 71.

FIG. 13 is a functional block diagram illustrating a processing sequence, which is classified into a plurality of blocks, that is executed by the correction value calculating section 84 of the management server 71. As illustrated in FIG. 13, the processing sequence that is executed by the correction value calculating section 84 is divided into a work situation pattern deciding section 87, a control command correction value database 85, a control command correction value calculating section 88, and a control command value adjusting section 86.

The work situation pattern deciding section 87 is a section that performs a process of deciding a work situation pattern on the basis of the soil quality, fluid temperature, bucket, and gradient statuses determined by the status determining section 90. FIG. 14 is a diagram illustrating soil quality, fluid temperature, bucket, and gradient statuses associated with work situation patterns. The work situation pattern deciding section 87 decides a work situation pattern on the basis of the diagram of FIG. 14 and the soil quality, fluid temperature, bucket, and gradient statuses transmitted from the status determining section 90. According to the present embodiment, since each of the statuses is divided into three divisions, there are 81 work situation patterns Pn. Specifically, the soil quality status is divided into three divisions SS1, SS2, and SS3 according to the soil quality, the fluid temperature status into three divisions SO1, SO2, and SO3 according to the fluid temperature, the bucket status into three divisions SB1, SB2, and SB3 according to the weight, and the gradient status into three divisions SG1, SG2, and SG3 according to the gradient. The work situation pattern decided by the work situation pattern deciding section 87 is output to the control command correction value calculating section 88 and the control command value adjusting section 86.

The control command correction value calculating section 88 is a section that searches the control command correction value database 85 for the work situation pattern decided by the work situation pattern deciding section 87, selects a control command correction value corresponding to the work situation pattern that is found as a result as a control command correction value to be transmitted to the controller 20, and transmits the control command correction value to the controller 20.

Figures 15, 16:
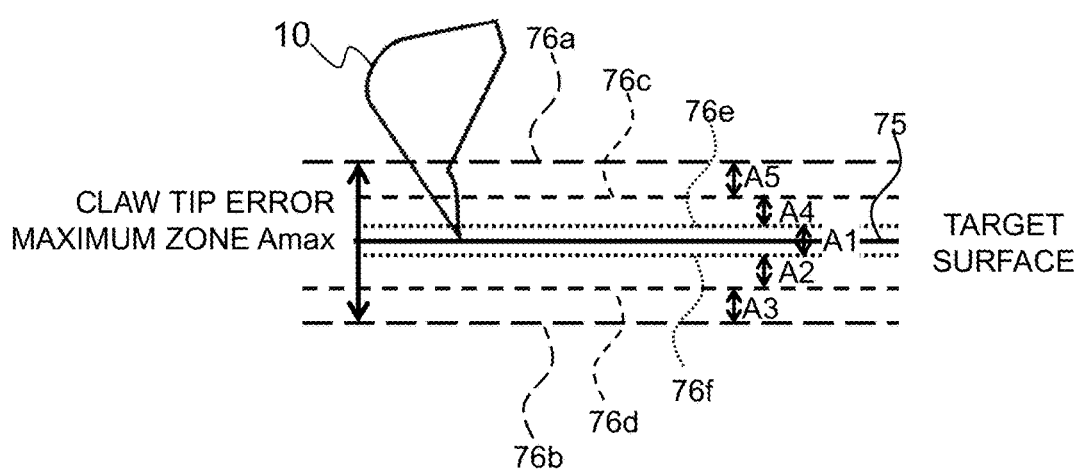
FIG. 15 is a diagram illustrating an example of a table stored in a control command correction value database 85 of the management server 71.
FIG. 16 is a diagram illustrating a claw tip error maximum zone Amax according to the embodiment.

FIG. 15 is a diagram illustrating an example of a table stored in the control command correction value database 85.

As illustrated in FIG. 15, the control command correction value database 85 stores control command correction values (ks1, ks2, . . . , ksn) established for the respective work situation patterns (P1, P2, . . . , Pn). Each of the work situation patterns is related to past control command correction values that were adjusted by the control command value adjusting section 86 in the past (hereinafter referred to as "adjusted control command correction values"). For example, the work situation pattern P1 illustrated in FIG. 14 stores adjusted control command correction values ks11, ks12, ks13, . . . as past values that were adjusted by the control command value adjusting section 86 in the past. As described later, the control command correction value related to each of the work situation patterns represents an average value of the past values of the corresponding work situation pattern. Specifically, when there are m adjusted control command correction values as past values relative to the work situation pattern P1, the equation: control command correction value ks1=(ks11+ks12+ . . . +ks1m)/m is satisfied. A control command correction value is updated (i.e., an average value of adjusted control command correction values is calculated) at the time an adjusted control command correction value is calculated by the control command value adjusting section 86. Next, details of such an updating process will be described below in relation to a process carried out by the claw tip error calculating section 37 and the correction value determining section 38 (FIG. 6) of the controller 20 and the control command value adjusting section 86 (FIG. 13) of the management server 71.

<Updating of Control Command Correction Value Database 85>

Referring back to FIG. 6, the claw tip error calculating section 37 of the controller 20 is a section that calculates claw tip errors while the hydraulic excavator 1 is performing an excavating operation under machine control. The "claw tip error" according to the present embodiment refers to the difference (deviation) between the operation locus of the bucket tip CP1 that is calculated by the work implement posture calculating section 30 while the hydraulic excavator 1 is performing an excavating operation under machine control (e.g., while an arm crowding process is being performed by the operation device 15b) and the shape (position) of the target surface stored in the target surface storage section 31. The claw tip errors calculated by the claw tip error calculating section 37 are output to the correction value determining section 38.

The correction value determining section 38 calculates an average value of claw tip errors (average claw tip error value) of the claw tip errors that have been calculated by the claw tip error calculating section 37 during an interval from the start to end of the latest excavating operation, and transmits the calculated average value of claw tip errors to the management server 71 (more specifically, the control command value adjusting section 86 of the correction value calculating section 84) if the average value of claw tip errors falls in a preset claw tip error maximum zone Amax established in advance for the target surface 75. FIG. 16 is a diagram illustrating the claw tip error maximum zone Amax according to the present embodiment. As illustrated in FIG. 16, the claw tip error maximum zone Amax is a zone established between boundary planes 76a and 76b that are established above and below the target surface 75. The two boundary planes 76a and 76b should preferably be spaced from the target surface 75 by equal distances, each of which may be in the range of 30 to 50 [mm] from the target surface 75, for example. Specifically, the claw tip error maximum zone Amax can be set in a range of ±30 to 50 [mm] from the target surface 75. When the average claw tip error value falls outside of the claw tip error maximum zone Amax, it is assumed that work requiring no accuracy (e.g., rough excavation work to be done with emphasis on work speeds providing the target surface 75 and the current terrain profile are sufficiently spaced from each other) is going to be done, and the average claw tip error value is not transmitted to the management server 71. The start and end of an excavating operation may be determined by a process of detecting a load on the arm cylinder 6 (e.g., a process of detecting a bottom pressure with a pressure sensor) in addition to a process of detecting an arm crowding process performed by the operation device 15b.

Referring back to FIG. 13, the control command value adjusting section 86 of the correction value calculating section 84 of the management server 71 is a section that performs a process of determining a claw tip error zone on the basis of the average claw tip error value transmitted from the controller 20, adjusting the control command correction value transmitted to the controller 20 using an adjustment value preset with the claw tip error zone, and storing the adjusted control command correction value as a past value of the corresponding work situation pattern in the control command correction value database 85.

Claw tip error zones are established as a plurality of zones within the claw tip error maximum zone Amax. As illustrated in FIG. 16, according to the present embodiment, there are five claw tip error zones A1 through A5 around the target surface 75 as a reference. The claw tip error zone A1 is a zone including and closet to the target surface 75, and is defined between a boundary 76e and a boundary 76f. From the standpoint of holding accuracy, the claw tip error zone A1 should preferably be equal to or smaller than a range of errors that are allowed to occur in work. The claw tip error zone A2 that is defined between the boundary 76f and a boundary 76d is established below the claw tip error zone A1. The claw tip error zone A3 that is defined between the boundary 76d and a boundary 76b is established below the claw tip error zone A2. The claw tip error zone A4 that is defined between a boundary 76c and the boundary 76e is established above the claw tip error zone A1. The claw tip error zone A5 that is defined between a boundary 76a and the boundary 76c is established above the claw tip error zone A4.

FIG. 17 is a diagram illustrating the claw tip error zones A1 through A5 and their description and the relation between the claw tip error zones A1 through A5 and a plurality of adjustment values 1 through 5 corresponding thereto. The adjustment values 1 through 5 are established such that a claw tip error or an average claw tip error value will approach zero (i.e., the bucket claw tip will approach the target surface 75) when the front work implement 1A is controlled according to the adjusted control command correction value. (1) If the average claw tip error value transmitted from the controller 20 (correction value determining section 38) belongs to the claw tip error zone A1, then the control command value adjusting section 86 decides that it is not necessary to adjust the control command correction value and uses the adjustment value 1=0. (2) If the average claw tip error value belongs to the claw tip error zone A2 for a small dip, then the control command value adjusting section 86 adjusts the control command correction value using the adjustment value 2. In this case, the adjusted control command correction value is smaller than 1. (3) If the average claw tip error value belongs to the claw tip error zone A3 for a large dip, then the control command value adjusting section 86 adjusts the control command correction value using the adjustment value 3. In this case, the adjusted control command correction value is smaller than 1 and is a value smaller than the value adjusted with the adjustment value 2. (4) If the average claw tip error value belongs to the claw tip error zone A4 for a small lift, then the control command value adjusting section 86 adjusts the control command correction value using the adjustment value 4. In this case, the adjusted control command correction value is larger than 1. (5) If the average claw tip error value belongs to the claw tip error zone A5 for a large lift, then the control command value adjusting section 86 adjusts the control command correction value using the adjustment value 5. In this case, the adjusted control command correction value is larger than 1 and is a value larger than the value adjusted with the adjustment value 4.

The adjusted control command correction value calculated in either one of (1) through (5) described above is stored in the control command correction value database 85 illustrated in FIG. 15 as a past value corresponding to a work situation pattern Pn decided last time with respect to the same hydraulic excavator 1 (i.e., a work situation pattern Pn decided when a control command correction value was calculated). Each time a new adjusted control command correction value is stored as a past value, the control command correction value database 85 updates the control command correction value by calculating an average value of past values of the corresponding work situation pattern Pn. If the average claw tip error value is larger than the claw tip error maximum zone Amax, then since the average claw tip error value is not transmitted to the management server 71, the control command correction value database 85 does not update the control command correction value.

<Description of Processing Sequence>

Figure 18:
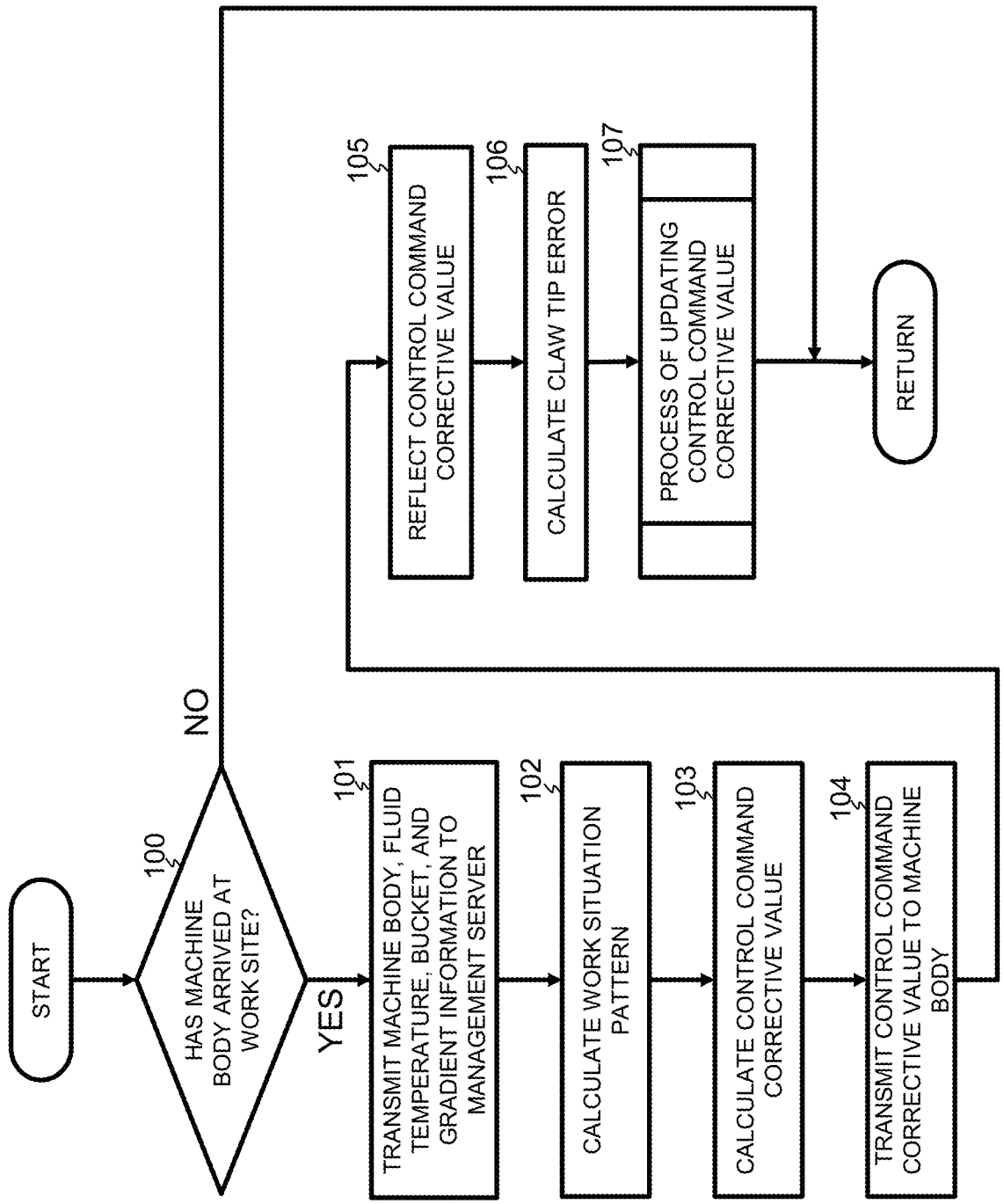
FIG. 18 is a flowchart of a processing sequence executed by the controller 20 of the hydraulic excavator 1 and the management server 71 according to the embodiment.

FIG. 18 is a flowchart of a processing sequence executed by the controller 20 of the hydraulic excavator 1 and the management server 71 according to the present embodiment, and FIG. 19 is a flowchart of a processing sequence executed in step 107 illustrated in FIG. 18.

When the power supply of the hydraulic excavator 1 is turned on, the processing sequence illustrated in FIG. 18 is started. However, it is assumed that the management server 71 is operating at all times.

In step 100, the controller 20 decides whether or not the hydraulic excavator 1 has arrived at a work site registered beforehand in the hydraulic excavator 1 on the basis of machine body position data calculated by the GNSS receiver 29. If the hydraulic excavator 1 has arrived at the site, then control goes to step 101, and if the hydraulic excavator 1 has not arrived at the work site, the processing of step 100 is repeated. The processing of step 100 may be omitted, and the processing sequence illustrated in FIG. 18 may be started from next step 101.

In step 101, the controller 20 (work situation parameter transmitting section 41) transmits machine body position data, fluid temperature data, weight data, and gradient data as work situation parameters to the management server 71.

In step 102, the management server 71 (the status determining section 90 and the work situation pattern deciding section 87) calculates, on the basis of the work situation parameters transmitted in step 101, a work situation pattern of the hydraulic excavator 1 that has transmitted the work situation parameters.

In step 103, the management server 71 (the control command correction value calculating section 88) calculates (selects) a control command correction value corresponding to the work situation pattern calculated in step 102 from the data stored in the control command correction value database 85.

In step 104, the management server 71 (the control command correction value calculating section 88) transmits the control command correction value calculated in step 103 to the hydraulic excavator 1 that has transmitted the work situation parameters in step 101.

In step 105, the controller 20 (work implement control section 40 though the command value correcting section 39 directly uses the control command correction value) executes machine control by reflecting the control command correction value transmitted from the management server 71 in step 104. Since the controller 20 thus makes corrections suitable for the work situation of the hydraulic excavator 1, the accuracy of machine control, i.e., the accuracy of work, is increased.

In step 106, the controller 20 (the claw tip error calculating section 37) calculates a claw tip error on the basis of the positional relation between the operation locus of the bucket claw tip calculated by the work implement posture calculating section 30 during an excavating operation performed after the control command correction value has been reflected in step 105 and the target surface 75.

In step 107, the updating process that updates the control command correction value stored in the control command correction value database 85 as illustrated in FIG. 19. Specifically, the processing of steps 200 through 208 illustrated in FIG. 19 is carried out.

In step 200, the controller 20 (the correction value determining section 38) calculates an average value of claw tip errors calculated in step 106.

In step 201, the controller 20 (the correction value determining section 38) determines whether or not the average claw tip error value calculated in step 200 is included in the claw tip error maximum zone Amax. If the average claw tip error value is included in the claw tip error maximum zone Amax, then the controller 20 (the correction value determining section 38) transmits the average claw tip error value to the management server 71 and control goes to step 202. If the average claw tip error value is not included in the claw tip error maximum zone Amax, then the controller 20 does not transmit the average claw tip error value to the management server 71 and the processing of step 107 is finished.

In step 202, the management server 71 (the control command value adjusting section 86) computes which one of the five claw tip error zones A1 through A5 (FIGS. 16 and 17) the average claw tip error value received from the controller 20 is included in.

In step 203, the management server 71 (the control command value adjusting section 86) selects an adjustment value corresponding to the claw tip error zone computed in step 202. Either one of the adjustment values 1 through 5 is now selected.

In step 204, the management server 71 (the control command value adjusting section 86) calculates an adjusted control command correction value by adjusting the control command correction value calculated in step 103 (FIG. 18) using the adjustment value selected in step 203.

In step 205, the management server 71 (the control command value adjusting section 86) refers to and temporarily stores the work situation pattern calculated in step 102 (FIG. 18).

In step 206, the management server 71 (the control command value adjusting section 86) adds the adjusted control command correction value calculated in step 204 to the past values of the work situation pattern stored in step 205 in the control command correction value database 85.

In step 207, the management server 71 (the control command correction value database 85) computes an average value of the past values of the work situation pattern to which the adjusted control command correction value has been added in step 206.

In step 208, the management server 71 (the control command correction value database 85) updates the control command correction value of the work situation pattern to which the adjusted control command correction value has been added in step 206 with the average value calculated in step 207. Then, the processing is finished.

Advantages

In the control system for the work machine that is configured as described above, control command correction values optimized for the work situation of the hydraulic excavator 1 on the basis of work situation parameters (machine body position data (soil quality data), fluid temperature data, bucket weight data, and gradient data) transmitted from the hydraulic excavator 1 to the management server 71 are transmitted from the management server 71 to the hydraulic excavator 1. In the hydraulic excavator 1, the hydraulic actuators 5, 6, and 7 (the solenoid proportional valves 500) are controlled by control commands (corrected control commands) corrected on the basis of the control command correction values received from the management server 71. Since machine control is performed on the hydraulic excavator 1 by the control parameters based on the work situation (work environment) of the hydraulic excavator 1, the accuracy of work is made higher than heretofore. According to the present embodiment, in particular, the control parameters start being corrected simply when the power supply of the hydraulic excavator 1 is turned on. In other words, it is possible to optimize the control parameters before work is started or at an initial stage, and the progress of work is not delayed, so that the plan of work can be observed. Further, as the control command correction value is decided according to the work situation parameters that are automatically transmitted from the hydraulic excavator 1, it is not necessary to take the trouble of presetting a plurality of control logics for each work situation, reducing control parameters and processing loads. Moreover, as the control command correction values can be shared by other hydraulic excavators providing the hydraulic excavators are in the same class, the control system is advantageous because of excellent versatility.

In addition, the management server 71 receives the average claw tip error value from the hydraulic excavator 1 to which the control command correction value has been transmitted, and updates the control command correction value for the corresponding work situation pattern in order to make the average claw tip error value approach zero. Specifically, the management server 71 calculates the adjusted control command correction value that represents the control command correction value adjusted to make the average claw tip error value received from the hydraulic excavator 1 approach zero, computes an average value of the adjusted control command correction value and other adjusted control command correction values in the past for the same work situation pattern that are stored in the control command correction value database 85, and uses the computed average value as a new control command correction value. Since the control command correction values that are stored in the control command correction value database 85 are optimized by being updated repeatedly, the reliability of the control command correction values is increased for quickly optimizing the control parameters of the hydraulic excavators.

Others

The present invention is not limited to the embodiment described above, but covers various changes and modifications without departing from the scope of the invention. For example, the present invention is not limited to work machines that include all the components described in the above embodiment, but may include work machines from which some of the components have been deleted. Moreover, some of the components in the above embodiment may be added to or replaced with components according to other embodiments.

In the above embodiment, the four work situation parameters (soil quality, hydraulic working fluid temperature, bucket weight, and target surface gradient) have been described. However, the work situation pattern may be decided in view of other work situation parameters such as machine class, ambient temperature, atmospheric pressure, and weather.

The correction of control commands for one hydraulic excavator 1 has mainly been described above. However, the control command correction values stored in the control command correction value database 85 of the management server 71 can obviously be shared (used together) by a plurality of other hydraulic excavators 1.

With regard to the flowchart of FIG. 18, when the control command correction values stored in the control command correction value database 85 of the management server 71 are accurate enough, the processing sequence may be ended up to step 105. This is because the processing from step 106 is concerned with the updating process of updating the control command correction values stored in the control command correction value database 85. For the same reason, since an average value of claw tip errors is calculated by the correction value determining section 38 in step 106 of FIG. 18 prior to step 200, for example, and the accuracy is maintained when the calculated average value is included in the claw tip error zone A1 illustrated in FIGS. 16 and 17, the processing sequence may be ended without going to step 107.

It has been described with reference to FIG. 18 that step 101 is executed when the hydraulic excavator 1 has arrived at the work site (see step 100). However, step 101 may be executed when the hydraulic excavator 1 stops being travelled after the track levers 13a and 13b have been operated, rather than going through step 100.

Alternatively, step 101 may be executed at periodic time intervals. Step 101 may be executed at the time when machine control is made effective. A dedicated switch for starting step 101 may be provided. The above processing starting conditions may be used in appropriate combinations.

In the foregoing, the vertical component of the velocity vector V1 computed from the target velocities for the hydraulic cylinders 5, 6, and 7 is multiplied by a control command correction value ksn. However, control commands or target velocities for the hydraulic cylinders 5, 6, and 7 may be multiplied by appropriate correction values. In this case, a control command or a target velocity for at least one of the hydraulic cylinders 5, 6, and 7 may be multiplied by an appropriate correction value.

The components of the controller 20 and the management server 71, the functions and processing sequences of the components, etc., may be implemented partly or wholly by hardware (e.g., integrated circuits that design logics for performing the functions). Further, the components of the controller 20 and the management server 71 may be implemented by programs (software) that perform the functions of the components of the controller 20 and the management server 71 when read and executed by an arithmetic processing unit (i.e., a CPU). Information on those programs may be stored in a semiconductor memory (flash memory, SSD, or the like), a magnetic storage device (hard disk drive or the like), a recording medium (magnetic disk, optical disk, or the like), for example.

In the description of the above embodiment, the control lines and the information lines that are construed as needed to describe the embodiment have been indicated. However, not all control lines and information lines relative to products are necessarily indicated. Actually, almost all components may be considered to be interconnected.

DESCRIPTION OF REFERENCE CHARACTERS

1: Hydraulic excavator
1A: Front work implement
1B: Machine body
2: Hydraulic pump
3a: Right track hydraulic motor
3b: Left track hydraulic motor
4: Swing hydraulic motor
5: Boom cylinder
6: Arm cylinder
7: Bucket cylinder
8: Boom
9: Arm
10: Bucket
11: Track structure
12: Swing structure
13a: Right track lever
13b: Left track lever
14a: Right control lever
14b: Left control lever
15a: Operation device
15a: Boom operation device
15b: Arm operation device
15c: Bucket operation device
15d: Swing operation device
16: Flow control valve
20: Controller
21: Boom angle sensor
22: Arm angle sensor
23: Bucket angle sensor
24: Machine body inclination angle sensor
25: Communication device
26: Communication antenna
28: GNSS antenna
29: GNSS receiver
30: Work implement posture calculating section
31: Target surface storage section
32: Target velocity calculating section
33: Solenoid valve control section
34: Work implement posture sensor
35: Target surface setting device
36: Operator's operation sensor
37: Claw tip error calculating section
38: Correction value determining section
39: Command value correcting section
40: Work implement control section
41: Work situation parameter transmitting section
49: Prime mover (engine)
50: Hydraulic working fluid tank
71: Management server
72: Positioning satellite
73: Design drawings generating and managing tool
74: Control command correction value database
75: Target surface
80: Soil quality status determining section
81: Fluid temperature status determining section
82: Bucket status determining section
83: Gradient status determining section
84: Correction value calculating section
85: Control command correction value database
86: Control command value adjusting section
87: Work situation pattern deciding section
88: Control command correction value calculating section
90: Status determining section
500: Solenoid proportional valve
590: Fluid temperature sensor

The invention claimed is:

1. A work machine comprising:
a multi-joint work implement that forms a target surface with a bucket;
a plurality of hydraulic actuators that drive the work implement;
a controller that is configured to calculate a control command for at least one of the plurality of hydraulic actuators to hold an operation locus of the bucket above the target surface on a basis of a distance from the work implement to the target surface, and to control the at least one of the hydraulic actuators on a basis of the control command; and
a communication device that performs bidirectional communication with a management server,
wherein the controller
transmits work situation parameters of the work machine to the management server,
receives, from the management server, a control command correction value that is computed by the management server on a basis of the work situation parameter and that represents a correction value for correcting the control command, and
controls the at least one of the hydraulic actuators with a corrected control command that represents the control command corrected on a basis of the control command correction value, wherein the controller is configured to calculate an average claw tip error value that represents an average value of differences between the target surface and the operation locus of a claw tip of the bucket when the controller controls at least one of the hydraulic actuators on a basis of the corrected control command, and to transmit the calculated average claw tip error value to the management server, and
the control command correction value is adjusted on a basis of the average claw tip error value transmitted to the management server in a past.

2. The work machine according to claim 1, wherein the work situation parameters include positional information on the work machine, temperature information on a hydraulic working fluid of the work machine, gradient information on the target surface, and weight information on the bucket.

3. The work machine according to claim 1,
wherein the control command correction value includes a value established for each of work situation patterns classified on a basis of the work situation parameters transmitted to the management server, and shared by other work machines.

4. A control system for controlling a work machine, the control system including the work machine according to claim 1 and the management server,
wherein the management server includes a database that stores a plurality of work situation patterns and a plurality of control command correction values corresponding to the plurality of work situation patterns, and
the management server is configured to calculate a corresponding one of the work situation patterns on a basis of the work situation parameters transmitted from the work machine, and transmit a control command correction value corresponding to the corresponding one of the work situation patterns to the controller.

5. The control system for controlling the work machine according to claim 4,
wherein the controller is configured to calculate an average claw tip error value that represents an average value of differences between the target surface and the operation locus of a claw tip of the bucket when the controller controls at least one of the hydraulic actuators on a basis of the corrected control command, and transmit the calculated average claw tip error value to the management server, the management server is configured to calculate an adjusted control command correction value that represents the control command correction value adjusted to make the average claw tip error value approach zero, on a basis of the average claw tip error value transmitted from the controller, the database stores past adjusted control command correction values corresponding respectively to the plurality of work situation patterns, and the control command corrected values stored in the database represent average values of the past adjusted control command correction values corresponding respectively to the plurality of work situation patterns.

* * * * *